United States Patent
Pareek et al.

(10) Patent No.: US 12,340,078 B2
(45) Date of Patent: Jun. 24, 2025

(54) METHOD AND DEVICE OF PROVIDING ADAPTIVE USER INTERFACE BASED ON USER FUNCTIONAL ELEMENTS

(71) Applicant: SAMSUNG ELECTRONICS CO., LTD., Suwon-si (KR)

(72) Inventors: Saurabh Pareek, Noida Uttar Pradesh (IN); Sulabh Rastogi, Noida Uttar Pradesh (IN); Silky Dudeja, Noida Uttar Pradesh (IN); Ashwini Kumar Kulshrestha, Noida Uttar Pradesh (IN); Rachit Jain, Noida Uttar Pradesh (IN)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/217,246

(22) Filed: Jun. 30, 2023

(65) Prior Publication Data
US 2023/0359339 A1    Nov. 9, 2023

Related U.S. Application Data

(63) Continuation of application No. PCT/KR2023/000403, filed on Jan. 9, 2023.

(30) Foreign Application Priority Data

Jan. 11, 2022  (IN) .............................. 202241001616

(51) Int. Cl.
  *G06F 3/04845*  (2022.01)
  *G06F 11/34*  (2006.01)
(52) U.S. Cl.
  CPC ...... *G06F 3/04845* (2013.01); *G06F 11/3438* (2013.01)

(58) Field of Classification Search
  CPC ................ G06F 3/04845; G06F 11/3438
  See application file for complete search history.

(56) References Cited

U.S. PATENT DOCUMENTS 5,799,292 A * 8/1998 Hekmatpour ......... G06F 40/103
                                                            715/205
10,560,804 B2  2/2020  Hodges et al.
(Continued)

FOREIGN PATENT DOCUMENTS

KR      20170031370 A    3/2017
KR      20200094829 A    8/2022

OTHER PUBLICATIONS

Schmicker, et al., AndroParse—An Android Feature Extraction Framework & Dataset . In Digital Forensics & Cyber Crime: 10th International Conference, ICDF2C, Sep. 10-12, 2018, New Orleans, Revised Selected Papers. Springer. 23 Pages. URL: https://core.ac.uk/download/pdf/214330478.pdf.

(Continued)

*Primary Examiner* — Daniel Samwel
(74) *Attorney, Agent, or Firm* — CANTOR COLBURN LLP

(57) ABSTRACT

One or more embodiments provide a method of providing an adaptive user interface in an electronic device. The method includes identifying, by the electronic device, a user functional element (UFE) in an application of the electronic device. The method further includes determining, by the electronic device, a trigger span for the UFE, and initiating, by the electronic device, a trigger in response to determining that the trigger span for the UFE is expired. The method further includes determining, by the electronic device, a probability of use of the UFE for which the trigger is initiated. The method further includes determining, by the electronic device, that the probability of the use of the UFE is less than a threshold probability. The method further (Continued)

| System Sluggish Table | Learnt Threshold Values | Current Configuration Values | Sluggish Factor | Weight of each Attribute | Sluggish Score For each Parameter |
|---|---|---|---|---|---|
| UFEs used | LV | CV | SF | W | |
| RAM Usage(MB) | 1395 | 1899 | 0.361 | 0.18 | 0.06498 |
| ROM Filled(%) | 65 | 55 | X | 0.1 | 0 |
| CPU Usage(%) | 65 | 85 | 0.307 | 0.15 | 0.04605 |
| GPU Usage(%) | 65 | 45 | X | 0.12 | 0 |
| Temperature(C) | 40 | 43 | 0.075 | 0.15 | 0.01125 |
| I/O Time(ms) | <50ms | 35ms | X | 0.08 | 0 |
| App Entry(ms) | 1200 | 1450 | 0.208 | 0.1 | 0.0208 |
| Component Start Time(ms) | <2000 | 2353 | 0.1765 | 0.1 | 0.01765 |
| DB access Time(ms) | <100ms | N.A. | X | 0.06 | 0 |
| Choreographer skipped frames(No.of frames) | <10 | 55 | 4.5 | 0.01 | 0.045 |
| Binder delay(ms) | <50ms | 75 | 0.5 | 0.1 | 0.05 |
| Percentage of App Crash(%) | <0.01 | 0.005 | X | 0.2 | 0 |
| Percentage of ANR(%) | <0.01 | 0.0115 | 0.15 | 0.25 | 0.0375 | includes updating, by the electronic device, the adaptive user interface associated with the UFE the based on the probability.

17 Claims, 22 Drawing Sheets

(56) References Cited

U.S. PATENT DOCUMENTS

| | | | |
|---|---|---|---|
| 10,635,261 | B2 | 4/2020 | Park et al. |
| 2009/0098914 | A1 | 4/2009 | Martin-Cocher et al. |
| 2011/0072378 | A1* | 3/2011 | Nurminen ............. G06F 9/5094 715/771 |
| 2013/0212542 | A1* | 8/2013 | Baughman .......... G06F 3/04883 715/866 |
| 2013/0227488 | A1 | 8/2013 | Tomar et al. |
| 2017/0010953 | A1* | 1/2017 | Kyte ................... G06F 11/3636 |
| 2017/0075516 | A1 | 3/2017 | Park et al. |
| 2017/0134906 | A1 | 5/2017 | Yoo |
| 2017/0192671 | A1 | 7/2017 | Osborne et al. |
| 2018/0136796 | A1 | 5/2018 | Ravindran et al. |
| 2018/0335968 | A1* | 11/2018 | Pauley ................... G06F 3/068 |
| 2019/0034212 | A1 | 1/2019 | Reilly |
| 2020/0133468 | A1 | 4/2020 | Chiu et al. |
| 2021/0124597 | A1 | 4/2021 | Ramakrishnan et al. |
| 2021/0342247 | A1* | 11/2021 | Ciolek .................... G06F 40/14 |
| 2021/0397463 | A1* | 12/2021 | Schimon ............... G06F 3/0482 |
| 2022/0091905 | A1 | 3/2022 | Lee et al. |
| 2022/0230118 | A1* | 7/2022 | Sharma ............... G06F 3/04847 |
| 2022/0308895 | A1* | 9/2022 | Ben-Elazar ............ G06N 3/045 |
| 2022/0334906 | A1* | 10/2022 | Patil .................... G06F 11/3438 |

OTHER PUBLICATIONS

Qadir, et al., "Automatic feature extraction, categorization and detection of malicious code in Android applications", International Journal of Information and Network Security (IJINS). 2014; 3(1): 12-17. URL: http://zuhairqadir.info/papers/paper32013.pdf.

Myat, et al., "Feature Extraction using Hybrid Analysis for Android Malware Detection Framework", International Journal of Engineering Research & Technology (IJERT), ISSN: 2278-0181, vol. 8 Issue 06, Jun. 2019, 5 Pages. URL: https://www.ijert.org/feature-extraction-using-hybrid-analysis-for-android-malware-detection-framework.

International Search Report and Written Opinion for International Application No. PCT/KR2023/000403; International Filing Date Jan. 9, 2023; Date of Mailing Apr. 11, 2023; 7 Pages.

Examination Report issued by the Indian Patent Office corresponding to Application No. 202241001616; Dated Jan. 11, 2022.

Examination Report issued by the Indian Patent Office corresponding to Application No. 202241001616; Dated Feb. 18, 2025.

* cited by examiner

FIG. 6

| System Sluggish Table | Learnt Threshold Values | Current Configuration Values | Sluggish Factor | Weight of each Attribute | Sluggish Score For each Parameter |
|---|---|---|---|---|---|
| UFEs used | LV | CV | SF | W | |
| RAM Usage(MB) | 1395 | 1899 | 0.361 | 0.18 | 0.06498 |
| ROM Filled(%) | 65 | 55 | X | 0.1 | 0 |
| CPU Usage(%) | 65 | 85 | 0.307 | 0.15 | 0.04605 |
| GPU Usage(%) | 65 | 45 | X | 0.12 | 0 |
| Temperature(C) | 40 | 43 | 0.075 | 0.15 | 0.01125 |
| I/O Time(ms) | <50ms | 35ms | X | 0.08 | 0 |
| App Entry(ms) | 1200 | 1450 | 0.208 | 0.1 | 0.0208 |
| Component Start Time(ms) | <2000 | 2353 | 0.1765 | 0.1 | 0.01765 |
| DB access Time(ms) | <100ms | N.A. | X | 0.05 | 0 |
| Choreographer skipped frames(No.of frames) | <10 | 55 | 4.5 | 0.01 | 0.045 |
| Binder delay(ms) | <50ms | 75 | 0.5 | 0.1 | 0.05 |
| Percentage of App Crash(%) | <0.01 | 0.005 | X | 0.2 | 0 |
| Percentage of ANR(%) | <0.01 | 0.0115 | 0.15 | 0.25 | 0.0375 |

METHOD AND DEVICE OF PROVIDING ADAPTIVE USER INTERFACE BASED ON USER FUNCTIONAL ELEMENTS

CROSS-REFERENCE TO RELATED APPLICATION(S)

This application is a bypass continuation of International Application No. PCT/KR2023/000403, filed on Jan. 9, 2023, which is based on and claims priority to Indian Patent Application No. 202241001616, filed on Jan. 11, 2022, in the Indian Intellectual Property Office, the disclosures of which are incorporated by reference herein in their entireties.

BACKGROUND

1. Field

One or more embodiments described herein relates to a user interface and more specifically to a method and device for providing an adaptive interface based on user requirement.

2. Description of the Related Art

Users of electronic devices such as a mobile or a laptop may add load to the electronic device (e.g., installing applications, adding data, application cache, services, etc.) which can make the electronic device sluggish over time. Also, certain features of the electronic device may remain unused throughout a lifetime of the electronic device. Thus, devices can become more sluggish as time passes.

One cause of the above-mentioned problems is unused user functional elements (UFEs). Often, the users do not use every UFE present inside an application, but the unused UFEs may be triggered un-knowingly, which results in extra load on the electronic device. For example, the user does not use a camera portrait mode, but the functions related to the camera portrait mode are loaded in a memory of the electronic device.

In another scenario, the cognitive load on the electronic device increases due to the unused UFEs, and the user has to think and perform extra interactions with the electronic devices to gain access to certain UFEs. This increases a disinterest in the user.

The above problems contribute to an increased random access memory (RAM) usage and reduces a battery life. As there may be many background services/listeners/observers, binders operations are running for unused UFEs.

Thus, it is desired to address the above mentioned disadvantages or other shortcomings or at least provide a useful alternative.

SUMMARY

One or more embodiments described herein provides an adaptive user interface (UI) based on a user preference and a user usage for increasing a battery life and providing a better user experience.

One or more embodiments described herein removes options/UFEs which are not used for long with low priority threshold from the u of the electronic device.

One or more embodiments described herein provides clutter free, smooth, and a jitter free UI experience to the user of the electronic device.

One or more embodiments described herein provides a restore option to dynamically restore the UFE/UI element to the user of the electronic device.

One or more embodiments described herein provide a method of providing an adaptive user interface (UI) in an electronic device, the method including: identifying, by the electronic device, a user functional element (UFE) in an application of the electronic device; determining, by the electronic device, a trigger span for the UFE; initiating, by the electronic device, a trigger in response to determining that the trigger span for the UFE is expired; determining, by the electronic device, a probability of use of the UFE, for which the trigger is initiated; determining, by the electronic device, that the probability of the use of the UFE is less than a threshold probability; and updating, by the electronic device, the adaptive user interface associated with the UFE the based on the probability.

In an embodiment, identifying, by the electronic device, the UFE comprises: generating, by the electronic device, a first interaction graph for each element in the application based on a user interaction and a plurality of parameters associated with the electronic device; extracting, by the electronic device, at least one of an element or event associated with a user interface element based on a user interaction; generating, by the electronic device, a second interaction graph based on the at least one of the extracted element or event; assigning, by the electronic device, a UFE score to each node in the second interaction graph, wherein each node corresponds to one of the at least one extracted element or event; identifying, by the electronic device, the UFE based on the UFE score.

In an embodiment the plurality of parameters associated with the electronic device comprises a performance of the electronic device, a reduced cognitive load on a user, and a personalized user interface experience.

In another embodiment determining the trigger span for the UFE comprises: determining, by the electronic device, an initial trigger span for the UFE based on a plurality of static parameters of the electronic device, wherein the plurality of static parameters comprises a battery usage, an available memory, and a processor load; and updating, by the electronic device, the initial trigger span in intervals based on a usage of the application and a preference of the user.

In an embodiment, updating the UI associated with the UFE comprises determining, by the electronic device, based on the probability, one of: whether the UFE is to be removed; whether the UFE is to be re-ordered in a list, whether a default functionality of the UFE is to be changed, and whether the UFE is to be re-positioned to a senior hierarchy using a skip list property; and updating, the adaptive user interface associated with the UFE in response to the determining by performing one of: removing the UFE, re-ordering the UFE in the list, changing a default functionality of the UFE, and re-positioning the UFE to the senior hierarchy using the skip list property.

In an embodiment the method further comprises assigning a UFE score to each node in an interaction graph, wherein the UFE score is used to determine a dependency between nodes of the interaction graph.

In an embodiment determining the probability of use of the UFE comprises: providing, by the electronic device, an interaction graph, a sluggish parameter, and a trigger span to a recurrent neural network (RNN); and receiving, by the electronic device, the probability of use of the UFE from the RNN.

In an embodiment, the method comprises restoring by the electronic device a removed UFE.

One or more embodiments described herein provide an electronic device for providing an adaptive user interface (UI) the electronic device including a memory; and a processor configured to: identify a user functional element (UFE) in an application of the electronic device; determine a trigger span for the UFE; initiate a trigger in response to determining that the trigger span is expired for the UFE; determine a probability of use of the UFE for which the trigger is initiated; determine that the probability of the use of the UFE is less than a threshold probability; and update the adaptive user interface associated with the UFE the based on the probability.

One or more embodiments described herein provide a method that includes monitoring an application over time to learn user interaction habits of a user with user functional elements of the application. The method further includes calculating a priority value for each of the user functional elements based at least in part on the user interaction habits. The method further includes, responsive to determining that a priority value fails to satisfy a priority threshold for at least one of the user functional elements, updating an adaptive user interface for the application based at least in part on the user interaction habits.

These and other aspects of the one or more embodiments described herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The method and the device illustrated in the accompanying drawings, throughout which reference letters indicate corresponding parts in the various figures. The embodiments herein will be better understood from the following description with reference to the drawings, in which:

FIG. 6 is a schematic diagram, illustrating an example table for calculation of the sluggish score, according to an embodiment as disclosed herein;

DETAILED DESCRIPTION

Figure 1:
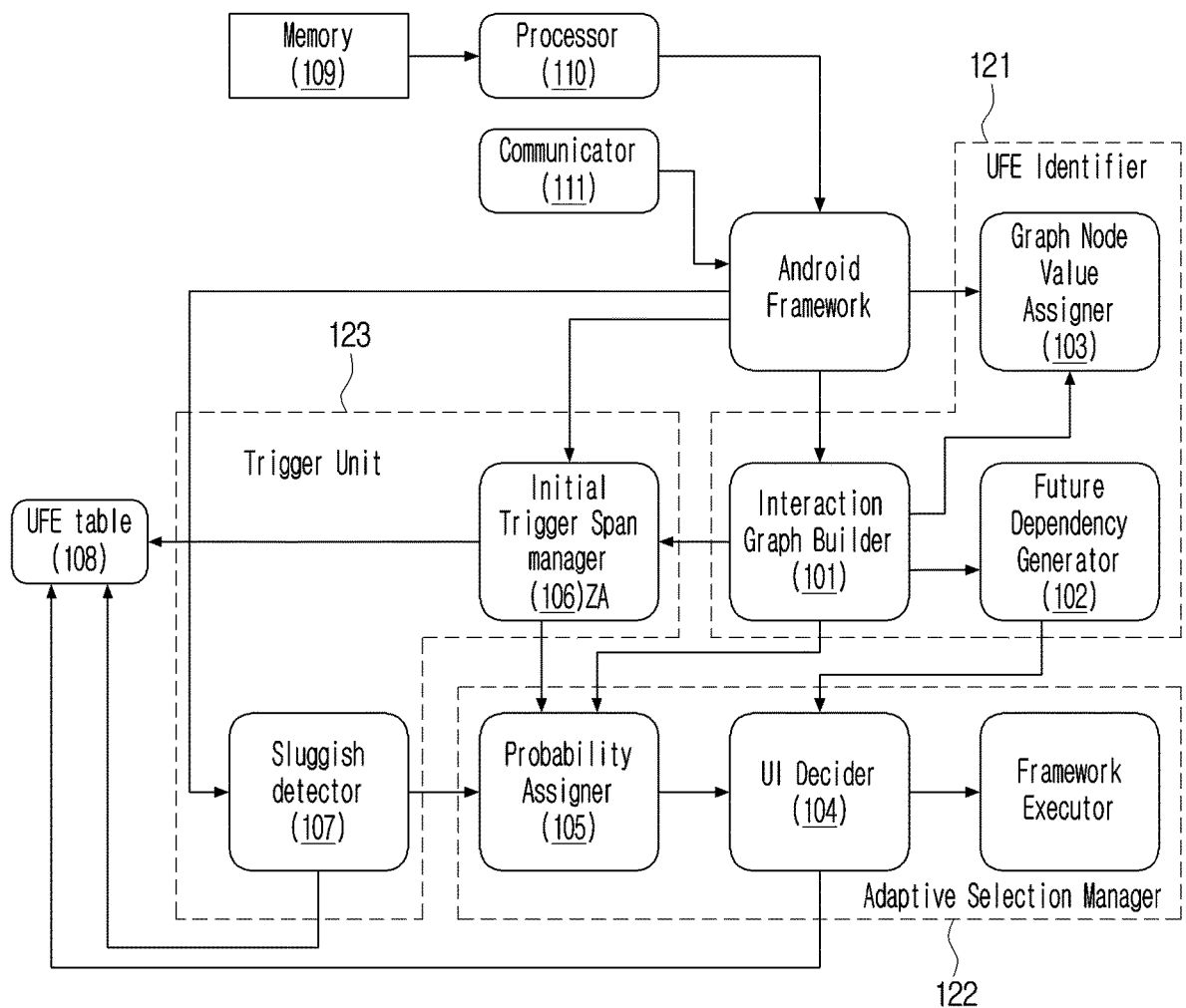
FIG. 1 is a block diagram illustrating an electronic device for providing an adaptive UI to a user for better performance, according to an embodiment as disclosed herein.

One or more of the embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features, and it should be understood that the embodiments presented herein are not limited by the accompanying drawings. As such, the present disclosure should be construed to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

One or more embodiments described herein provide a device and method for providing an adaptive user interface (UI) in an electronic device, the method includes: identifying, by the electronic device (100), a user functional element (UFE) in an application of the electronic device (100); determining, by the electronic device (100), a trigger span for the UFE; initiating, by the electronic device (100), a trigger in response to determining that the trigger span for the UFE, is expired; determining, by the electronic device (100), a probability of use of the UFE for which the trigger is initiated; determining, by the electronic device (100), that the probability of the use of the UFE is less than a threshold probability; and updating, by the electronic device (100), the adaptive user interface associated with the UFE the based on the probability.

Referring now to the drawings, and more particularly to FIGS. 1 through 10D, where similar reference characters denote corresponding features consistently throughout the figures, there are shown in accordance with one or more embodiments.

FIG. 1 is a block diagram illustrating an electronic device (100) for providing an adaptive UI to a user for better performance, according to an embodiment as disclosed herein.

The electronic device (100) may be, for example, but not limited to, a mobile device, a cellular phone, a smart phone, a personal digital assistant (PDA), a tablet computer, a laptop computer, an Internet of things (IoT) device, an artificial intelligent (AI) device or the like.

In an embodiment, the electronic device (100) includes an interaction graph (IG) builder (101), a future dependency generator (102), a graph node value assigner (103), a user interface (UI) decider (104), a probability assignor (105), an initial trigger span manager (106), a sluggish detector (107), a UFE table (108), a memory (109), a processor (110), and a communicator (111). In an embodiment, the interaction graph builder (101), the graph node value assigner (103), and the future dependency generator (102) are part of a UFE identifier 121. In another embodiment, the UI decider (104) and the probability assignor (105) are part of an adaptive section manager 122. In yet another embodiment, the initial trigger span manager (106), and the sluggish detector (107) are part of a trigger unit 123.

In an embodiment, the UFE identifier 121 is responsible for identifying the UI elements in an application used by the user of the electronic device (100). The UI element is a probable candidate for modification (e.g., remove, reorder, and/or the like, including combinations and/or multiples thereof) based on a user interaction and system impact so as to provide improved performance, reduce cognitive load on user, and provide a personalized UI experience. In an embodiment, a UFE remove action skips loading resources in a cache, dependent libraries, and other dependencies associated with the UFE, thereby saving the memory and the processor function.

In another embodiment, in a list of UI element, navigating the entire list is not necessary due to reordering the UFE, which saves loading of UI elements in the cache.

This UFE identifier 121 is also responsible for building an interaction graph and identifying the user functional elements (UFEs) and monitors user interactions with the identified UFE.

In an embodiment, an input to the UFE identifier 121 is screen content captured from a layout of the application used by the user. Element such as texts, images, icons, view groups, etc. are extracted in the layout. Further, the types of interactions like click, move, long press, etc. are extracted, which are performed with the identified UI element. Further, the UFE identifier 121 determines whether the extracted event results into starting a new screen (e.g., fragment or activity) or not. Further, a UFE score is assigned to each element. Based on the UFE, score, the UFE, identifier 121 decides whether the element is a UFE or not. Further, for the identified UI components, an interaction graph (IG) is created. The IG is used to identify UFEs and maintains the interaction data and a feature dependencies graph (FDG) between different UFEs.

In another embodiment, the trigger unit 123 triggers the adaptive selection manager to modify the UI component. In an embodiment, there are two trigger points namely, a load factor and a system performance.

When, the UFE identifier 121 identifies the UFEs for the application, the initial trigger span is calculated for each feature.

The trigger span of a feature indicates a number of days after which feature will be checked for UI update or removal. An initial trigger span is calculated based upon pre-learned static parameters like an amount of RAM consumed by the feature, a battery usage, a central processing unit (CPU) load, an application not responding error (ANRs), binder transaction delays, and the like.

A UFE age factor depends upon a time of introduction of the UFE. Some elements may be introduced later, and trigger span for such elements is greater. According to an embodiment, the initial trigger span in calculated for the features, wherein the trigger span is the number of days after which the feature is considered while updating the UI.

The trigger span is updated after each iteration based on a user usage and a user preference. When the trigger span for the UFE expires, the trigger is sent to the adaptive selection manager for the corresponding UFE.

In an embodiment, the trigger span is calculated based on a feature's system requirement is given by equation 1.

$$\text{Trigger Span} = \{\}\frac{\text{Default Trigger Space}}{\text{Load Factor}} - UFE \text{ age factor}. \quad \text{Eqn. 1}$$

The load factor is given by equation 2.

$$\text{LoadFactor} = \text{RAMFactor}^2 + \Sigma_{x=1}{}^n \text{SystemFactor}x \quad \text{Eqn 2.}$$

In an embodiment, the RAM factor, the battery factor, the CPU factor, the application ANR factor and the binder factor which are considered for determining the trigger span are given by equation 3-7 respectively.

$$RAM \text{ factor} = \frac{Ram \text{ Consumed}}{\text{Safe } Ram \text{ Limit}} \quad \text{Eqn. 3}$$

$$\text{Battery Factor} = \frac{\text{Battery Consumed}}{\text{Safe Battery Limit}} \quad \text{Eqn. 4}$$

$$CPU \text{ Factor} = \frac{CPU \text{ Consumed}}{\text{Safe } CPU \text{ Limit}} \quad \text{Eqn 5}$$

$$AppANR\ Factor = \frac{ANR\ Count}{Safe\ Anr\ Limit} \qquad \text{Eqn 6}$$

$$Binder\ Delay\ Factor = \frac{Binder\ Delay}{Safe\ Binder\ Delay} \qquad \text{Eqn 7}$$

In an embodiment, the system performance monitoring is measured by calculating a sluggish score, which is calculated based on performance parameters for the whole system, like total RAM consumed, read only memory (ROM) consumed, the total CPU usage, the electronic device (100) temperature, etc. If the sluggish score becomes less than a threshold value, then the trigger is sent to the adaptive selection manager 122 to optimize the UFEs to improve performance. The sluggish factor is given by equation 8 and the sluggish score is given by equation 9.

$$\text{Sluggish Factor} = (CV-LV)/LV \qquad \text{Eqn 8.}$$

$$\text{Sluggish Score} = \Sigma_{x=1}^{n} Wx * SFx \qquad \text{Eqn 9.}$$

wherein, n is a number of attributes, SF is the sluggish factor for each attribute, CV is a value of attribute as per current configuration of system, LV is an average value of attribute when the electronic device (100) was pre-tested with a sluggish factor level of 0, W is a weight priority coefficient for each attribute, and sluggish score is a performance deviation score based on current configuration.

In an embodiment, the adaptive selection manager, first calculates the UFE's probability of usage by the user. In an embodiment, the probability is determined by the probability assignor (105) using a machine learning model such as a recurrent neural network (RNN) attention model which takes triggers from the trigger unit 123 and takes input from the IG builder (101) and the UFE table (108). Based on probability, the UI decider (104) decides whether the UFE needs to reorder in a list, whether a default functionality of any UFE needs to be changed, whether any UFE need to be repositioned to a parent's hierarchy using a SkipList property, whether any UFE need to be removed from a list, and/or the like, including combinations and/or multiples thereof.

In an embodiment, the adaptive selection manager 122 uses parameters from the UFE table (108) which are statically defined and are used for modelling of performance driven factors for each UFE present in the IG builder (101).

In another embodiment, the probability assigner (105) uses the RNN attention model for assigning probabilities for each path in the interaction graph. The UFE scores are converted to probabilities while taking several other factors such as trigger, static UFEs as input. Probabilities for the children of a node sum to 1. Higher probabilities indicate a greater possibility of the UFE being used.

In another embodiment, the UI decider (104) is used for detection and execution of UI changes based on the skip levels and/or, if there are no UI changes, then a trigger is updated to a new value based on a probability calculation.

In an embodiment, the architecture in FIG. 1 also includes a restore manager (not shown), which maintains a restore pool. Whenever the UFE and/or a sub UFE is removed by the adaptive selection manager 122, the UFE and/or the sub UFE is added to the restore pool. Upon addition of any item to the restore pool, a restore option is shown in the options menu on the electronic device (100). When the user clicks on this restore option, changes which have been made in the electronic device (100) with regards to the UFE are shown to the user. In an embodiment, the user may then select any change to be reverted and the corresponding change is undone.

In another embodiment, feedback is provided so that the score and the priority for that UFE and/or sub UFE is updated. In an embodiment, the feedback provides flexibility for predicting which UFE is not useful and/or is rarely used, and that UFE then can be removed without diminishing the user experience as the user has option to restore the corresponding UFEs. Further, the feedback also gives flexibility to a user as the user can restore any option which the user might use rarely, and once the work is done, the UFE, will again be removed according to an ageing policy if the UFE is not used again by user, such as within a certain time frame (e.g., 1 week).

In an embodiment, the memory (109) stores instructions to be executed by the processor (110) for identifying the UFEs and accordingly updating the UI for the user. The memory (109) storage elements may include magnetic hard discs, optical discs, floppy discs, flash memories, forms of electrically programmable memories (EPROM) or electrically erasable and programmable (EEPROM) memories, and/or the like, including combinations and/or multiples thereof.

In addition, the memory (109) may, in some examples, be considered a non-transitory storage medium. The term "non-transitory" may indicate that the storage medium is not embodied in a carrier wave or a propagated signal. However, the term "non-transitory" should not be interpreted that the memory (109) is non-movable. In certain examples, a non-transitory storage medium may store data that can, over time, change (e.g., in Random Access Memory (RAM) or cache). The memory (109) can be an internal storage and/or the memory (109) can be an external storage unit of the electronic device (100), a cloud storage, and/or any other type of external storage.

In an embodiment, the processor (110) communicates with the interaction graph builder (101), the future dependency generator (102), the graph node value assigner (103), the UI decider (104), the probability assignor (105), the initial trigger span manager (106), the sluggish detector (107), the UFE table (108), the memory (109), and/or the communicator (111). The processor (110) is configured to execute instructions stored in the memory (109) for providing the adaptive UI based on the identified UFE. The processor (110) may include one or a plurality of processors, may be a general purpose processor, such as a central processing unit (CPU), an application processor (AP), or the like, a graphics-only processing unit such as a graphics processing unit (GPU), a visual processing unit (VPU), an artificial intelligence (AI) dedicated processor such as a neural processing unit (NPU), and/or the like, including combinations and/or multiples thereof.

In an embodiment, the communicator (11) is configured for communicating internally between internal hardware components of the electronic device (100) and with external devices via one or more networks. In an embodiment, the communicator (111) includes an electronic circuit specific to a standard that enables wired or wireless communication.

Thus, as described herein, the proposed method and the electronic device (100) identifies unused UFEs in the application and accordingly updates the UI by removing the UFEs or providing a restore option to restore the removed UFEs.

Although the embodiment of FIG. 1 shows various hardware components of the electronic device (100), it is to be understood that other embodiments are not limited thereon.

In other embodiments, the electronic device (100) may include another number (e.g., more or less) of components. Further, the labels or names of the components are used only for illustrative purpose and does not limit the scope of the invention. One or more components can be combined together to perform same or substantially similar function to providing the adaptive UI to the user.

Figure 2:
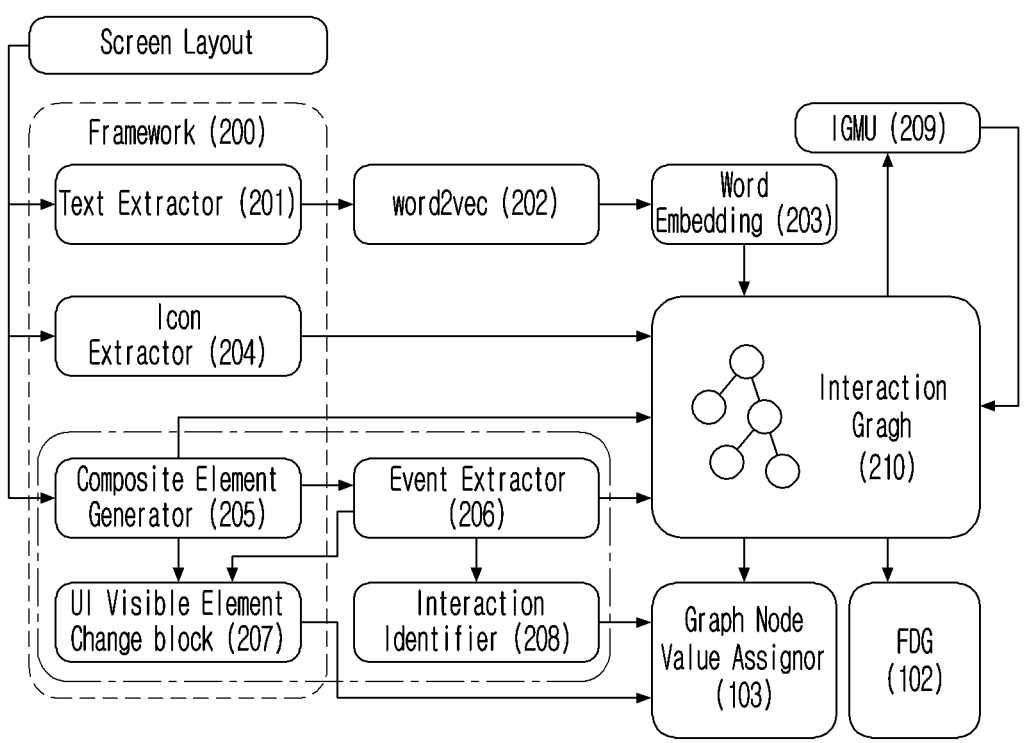
FIG. 2 is a flow diagram, illustrating interaction between different modules for generation of an interaction graph, by an interaction graph builder, according to an embodiment as disclosed herein.

FIG. 2 is a flow diagram, illustrating interaction between different modules for generation of the interaction graph, by the interaction graph builder (101), according to an embodiment ad disclosed herein.

As shown in FIG. 2, a framework (200) is referred from FIG. 1. The framework (200) of the electronic device (100). Apart from the framework, as shown in FIG. 2, the flow diagram includes other components as explained below.

In an embodiment, the framework (200) includes an element extractor (not shown in figure) for extracting content from the UI elements by reading framework such as LinearLayout, TextView, etc.

The framework (200) further includes a text extractor (201) for extracting the text from each element if present. The extracted text is then forwarded to a word2vec (202) for creation of word embedding which depict the text in an n-dimensional space. Further, an output of the word2vec (202) is sent to a word embedding block (203) for creating a word embedding for each UI element's textual data, which is a vector in an n dimensional space with a weight assigned.

An icon extractor (204) extracts the icon (or image) from each element if present. A composite element generator (205) creates a composite graph of each element with a parent element. The composite element generator (205) creates a layer-wise UI element graph. An event extractor (206) maps events with a UI element based on interactions performed by the user such as MOTION_EVENT, ACTION_MOVE, etc., which are retrieved from the framework level.

The IG builder (101) creates the interaction graph (210) between the elements. Each node in the graph is stored as an object which includes data from the event extractor (206), the composite element generator (205), and the icon extractor (204) word embedding. The IG builder (101) tracks interactions by updating the interaction graph (210) as and when interactions update and tracks dependencies between the UI elements.

A UI visible element change block (207) uses the UI elements present on the screens and tracks the visible changes when interactions take place such as ACTIVITY_LOADING, FRAGMENT_CREATION, etc.

An interaction identifier (208) recognizes interactions such as service creation, broadcast receivers, network queries, etc. which are useful for tracking dependencies.

The graph node value assigner (103) assigns the UFE score for each node in the interaction graph (210) which is used for higher processing and determination of pruning of links between nodes of the graph.

An interaction graph monitoring unit (IGMU) (209) is used for monitoring of changes in interaction graph such as an update to the application which causes the interaction graph to be updated.

The future dependency generator (102) generates dependencies between different composite elements in the interaction graph which have not yet been formed. According to an embodiment, a neural network is used to generate dependencies using a link function.

Figure 3A:
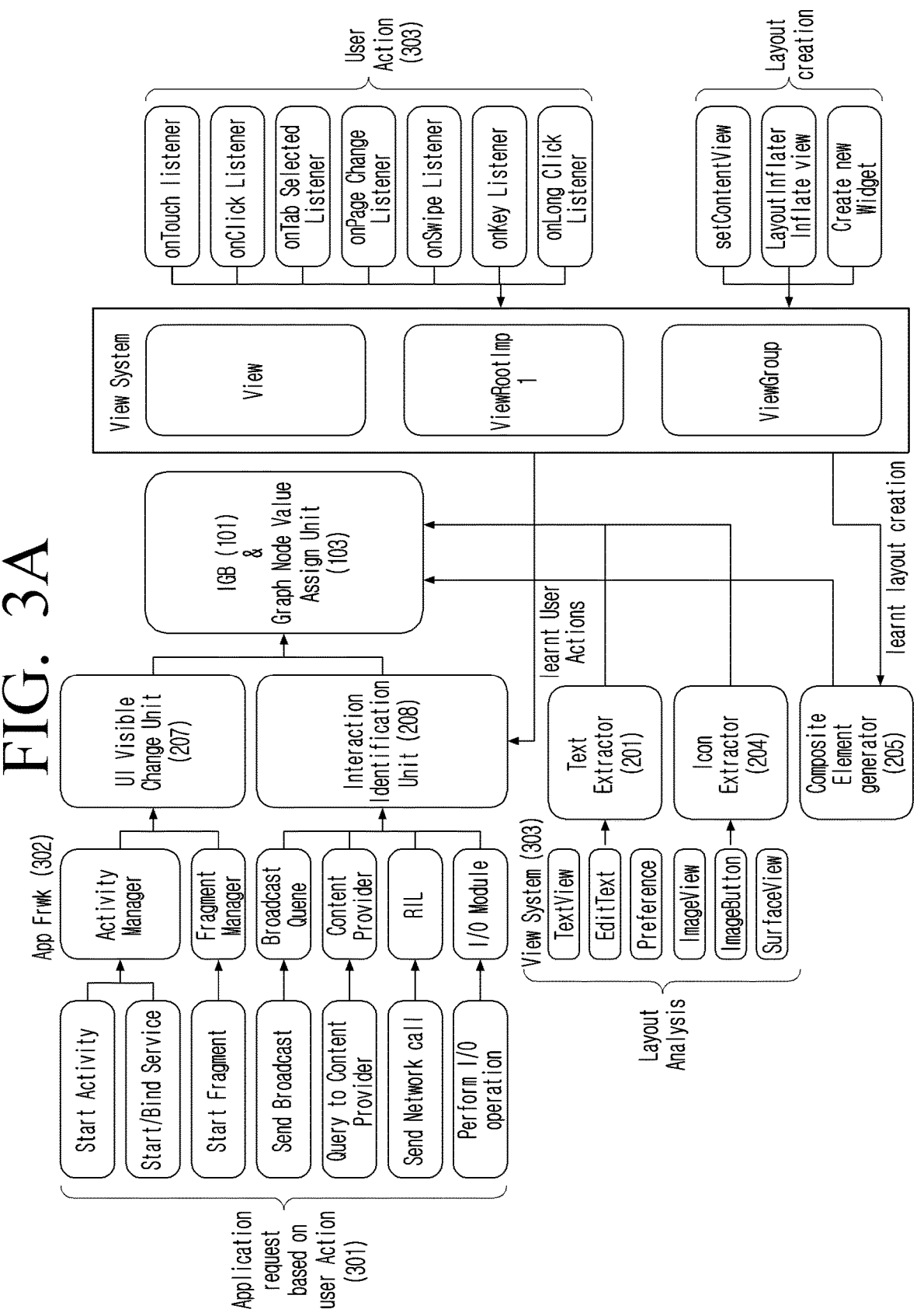
FIG. 3a is a block diagram, illustrating interaction between an access framework and different entities, for generating the adaptive UI, according to an embodiment as discloses herein.

FIG. 3A is a block diagram, illustrating an interaction between the access framework and different entities, for generating the adaptive UI, according to an embodiment as disclosed herein.

As shown in FIG. 3a, the interaction graph builder (101) takes input from the text extractor (201), the word embedding block (203), the icon extractor (204), the composite element generator (205) and the event extractor (206). Based on the above mentioned inputs, the interaction graph builder (101) generates a node of the interaction graph.

In an embodiment, application requests based on user action 301 are input and can include a start activity, a start/bind service, a start fragment, a send broadcast, a query to content provider, a send network call, and a perform input/output (I/O) operation. A start activity, and a start fragment show new content on a screen.

A start/bind service is used to execute work in background.

A send broadcast is used for message passing across system. A query to content provider is used for database management. A send network call manages network operations. An I/O module performs I/O operations of system.

In an embodiment, an application framework 302 handles an application window and other applications background operations. A view system framework 303 is responsible for measuring, laying out and drawing views and view groups and manages the view hierarchy of each app using ViewRootImpl. A user action block 303 provides for viewing system manager user events like touch/click.

Figure 3B:
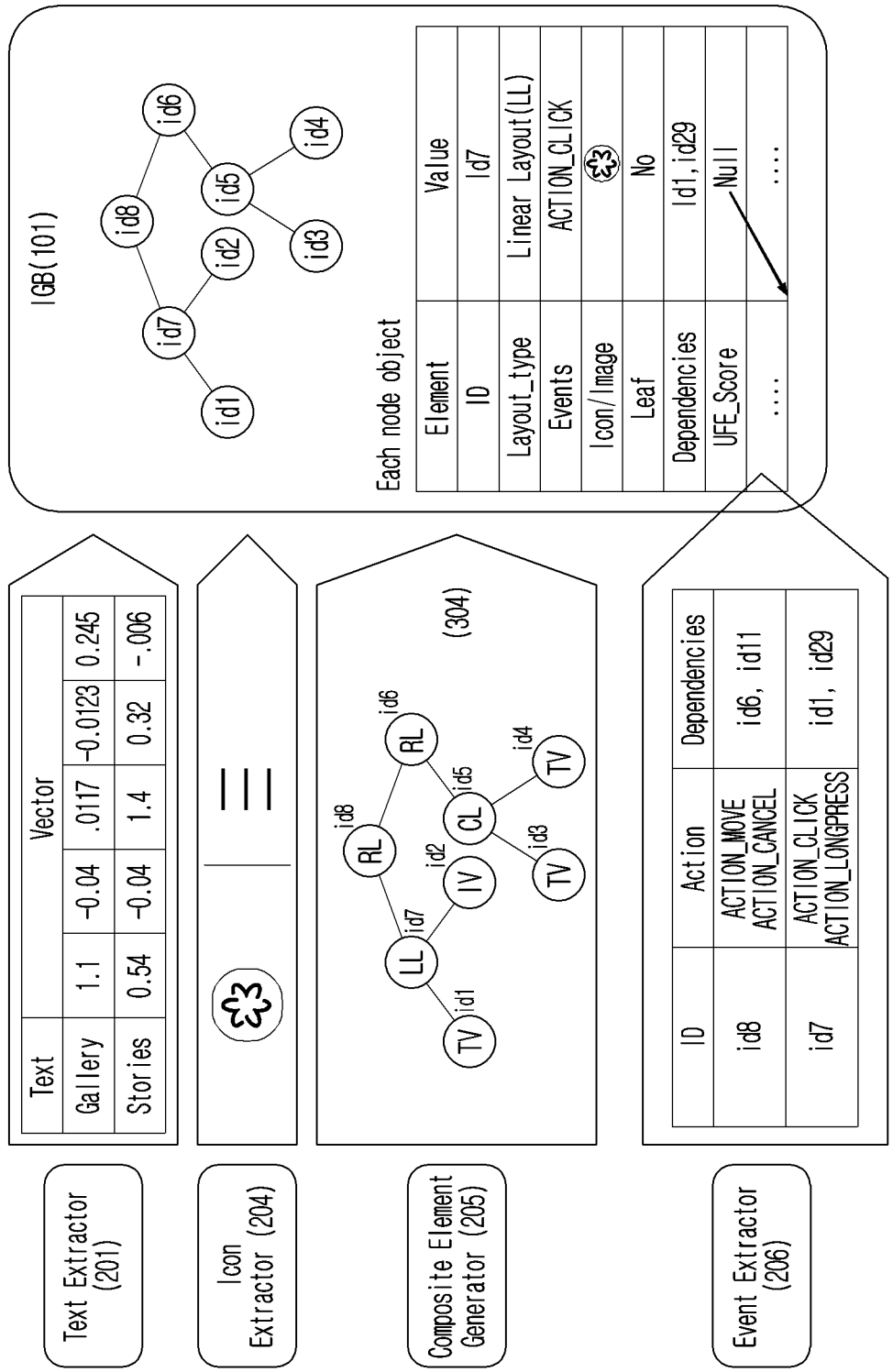
FIG. 3b is a schematic diagram illustrating working of the interaction graph builder of FIG. 1, according to an embodiment as disclosed herein.

FIG. 3B is a schematic diagram illustrating working of the interaction graph builder (101), according to an embodiment as disclosed herein.

As shown in FIG. 3b, the text extractor (201) provides the vector information as shown. Further, the icon extractor (204) provides details such as the image. The composite element generator (205) generates the interaction graph (304) as shown in FIG. 3B. The event extractor (206) provides information about the event such as the action move, the action cancel for each node in the interaction graph and its associated node. For example, the table in FIG. 3B shows the information about the node id8 and id7. For the referred node, the associated action and dependent nodes are illustrated. For node id8, the action is move and cancel and the dependent nodes are id6 and id11. For node id7, the action is click and long press and the dependent nodes are id1 and id29.

Finally, the interaction graph (304) along with other information is generated as shown in FIG. 3A. A final output of the interaction graph builder (101) can include information such as a linear layout, the event, the icon/image associated with the node as shown in FIG. 3B and below table 1 along with the interaction graph.

TABLE 1

| Element | Value |
| --- | --- |
| ID | Id7 |
| Layout Type | Linear Layout (LL) |
| Events | ACTION_CLICK |
| Icon/Image | |
| Leaf | No |
| Dependencies | ID1, id29 |
| UFE Score | Null |

Figure 4:
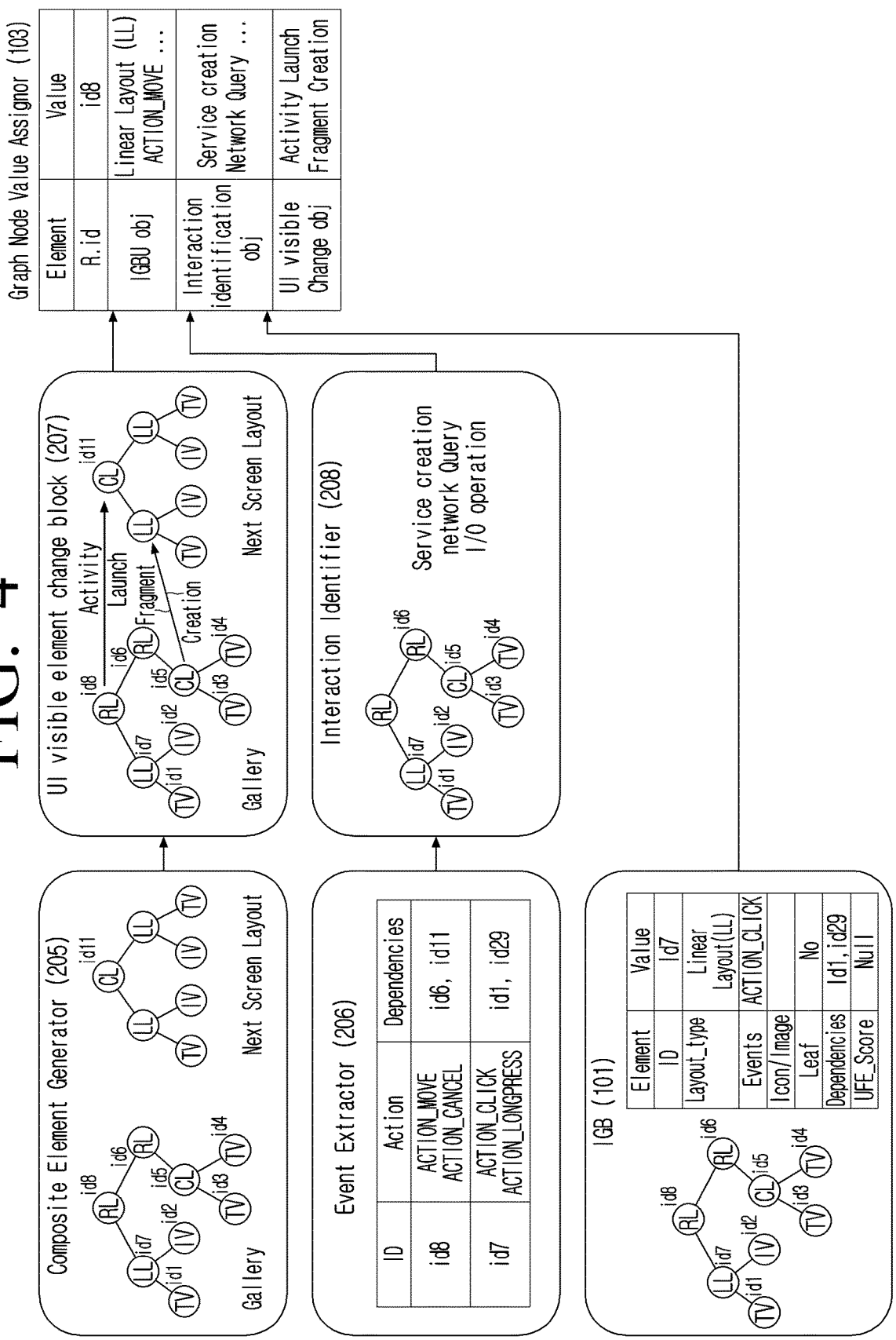
FIG. 4 is a schematic diagram, illustrating generation of a node of the interaction graph, according to an embodiment as disclosed herein.

FIG. 4 is a schematic diagram, illustrating assigning a node value to the nodes of the interaction graph, according to an embodiment as disclosed herein.

As shown in FIG. 4 the composite element generator (205), creates a composite graph of each element with parent element. According to an embodiment, the composite graph is a layer-wise UI element graph.

The UI visible element change block (207) uses the UI elements present on a screen of the electronic device (100) and tracks the visible changes when interactions take place such as an activity loading, a fragment creation, etc.

The event extractor (206) maps events with a UI element based on interactions performed by the user such as a motion event, action move and the like, which are retrieved from the framework level.

The interaction graph builder (101) creates the interaction graph between the elements. Each node in the graph is stored as an object which includes data from the event extractor (206), the composite element generator (205), the icon extractor (204), and the word embedding (203). The interaction graph builder (101) serves tracks interactions by updating the graph as and when interactions update and tracks dependencies between the UI elements.

The interaction identifier (208) recognizes interactions such as service creation, broadcast receivers, network queries, etc. which are useful for tracking dependencies.

The graph node value assignor (103) determines the node value for each node based on the inputs as shown in FIG. 4.

Figure 5:
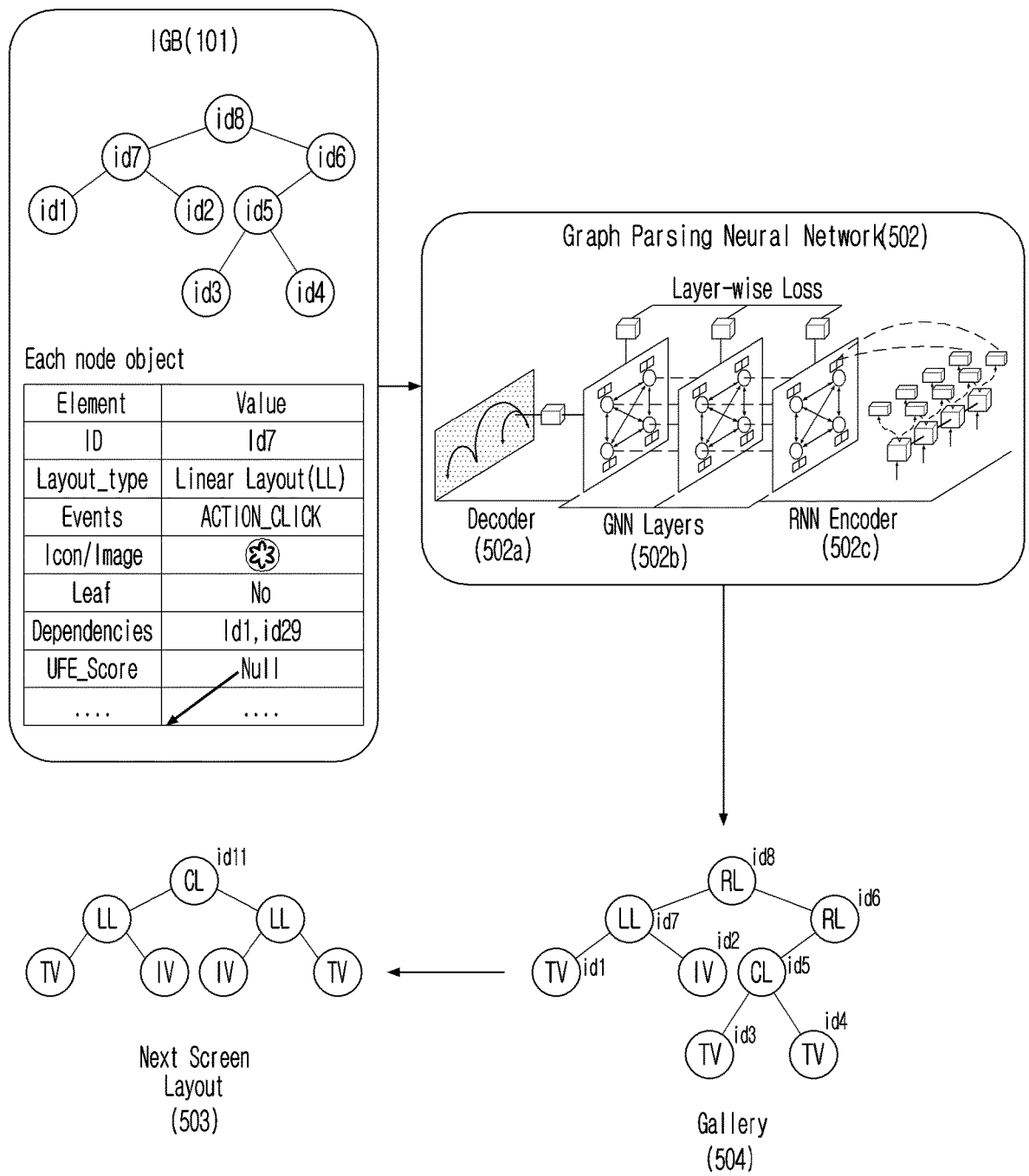
FIG. 5 is a schematic diagram, illustrating generation of future dependencies, according to an embodiment as disclosed herein.

FIG. 5 is a schematic diagram illustrating generation of future dependencies, according to an embodiment as disclosed herein.

The future dependency generator (102) is used for generating dependencies between different composite elements in the interaction graph. The future dependency generator (102) identifies dependencies between the elements which have not yet been identified. Since the user may not necessarily provide all dependencies, one or more embodiments described herein use a graph parsing neural network (502) to generate dependencies which may arise in the future.

As shown in FIG. 5, an interaction graph from the interaction graph builder (501) is provided as an input to the graph parsing neural network (NN) (502). The graph parsing NN includes a decoder (502a), a plurality of graph neural network (GNN) layers (502b), and an RNN encoder (502c).

The graph parsing NN (502) provides the future dependencies between the composite element as shown at (503) and (504). In an embodiment, darker the link between two composite elements, higher the probability that a dependency could be generated in the future.

FIG. 6 is a schematic diagram illustrating an example table for calculation of the sluggish score, according to an embodiment as disclosed herein.

As sated above, when the sluggish score exceeds a threshold (e.g., a threshold sluggish score), then a trigger is sent to an adaptive selection manager to take one or more optimization actions. In an example embodiment, as described herein, the threshold sluggish score is determined and the actual sluggish score for the UFEs used as shown in FIG. 6 is determined. Further, a percentage increase in sluggishness is determined as below:

Threshold Sluggish Score $(TTS) =$ $$0.15 \times \sigma x = 1 \ nWx = 0.15 \times 1.59 = 0.2385$$

$SluggishScore(SS) = (0.361 \times 0.18) - (0.307 \times 0.15) +$ $(0.075 \times 0.15) + (0.208 \times 0.1) - (0.1765 \times 0.1) +$ $(4.5 \times 0.01) + (0.5 \times 0.1) + (0.15 \times 0.25) - 0.29323$ -continued % Increase in Sluggishness =

$$((SS - TSS)/TSS) \times 100 = ((0.29323 - 0.2385)/0.2385) \times 100 = 22.95\%$$

As shown, since the percentage increase in sluggishness is more than 15%, a SluggishNode object containing a map having pairs of values of parameters whose sluggish factor>0 is sent as a trigger.

Figure 7:
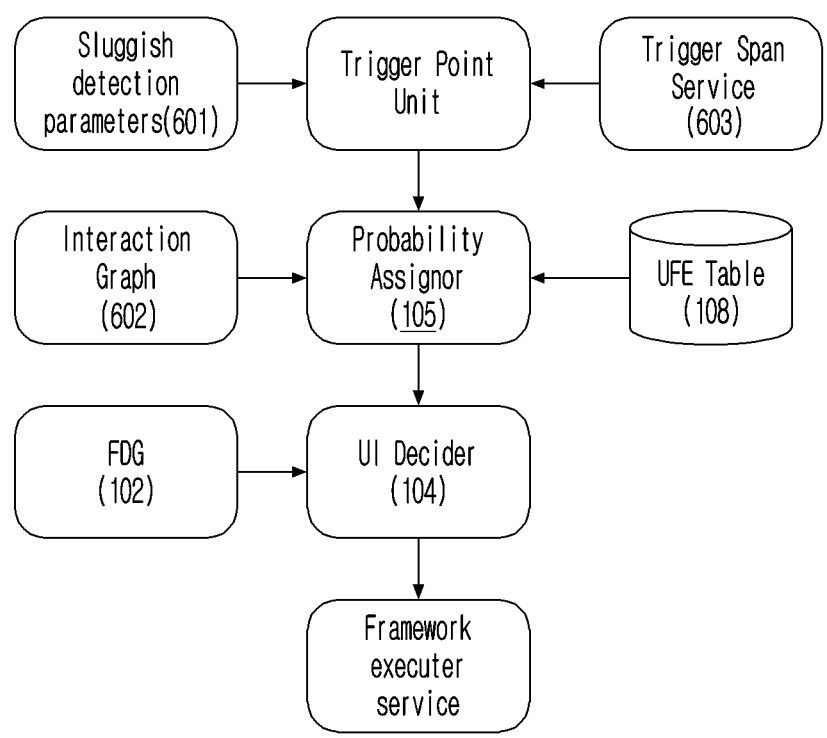
FIG. 7 is a schematic diagram, illustrating interaction between different elements of the electronic device of FIG. 1 for assigning probabilities to paths in the interaction graph, according to an embodiment as disclosed herein.

FIG. 7 is a schematic diagram, illustrating interaction between different elements of the electronic device (100) for assigning probabilities to each path in the interaction graph, according to an embodiment as disclosed herein.

As shown in FIG. 7, the probability assignor (105) takes the sluggish detection parameters (601), the interaction graph (602), the UFE table (108), and the trigger span service (603) as the input and assign a probability to each path in the interaction graph.

The adaptive selection manager calculates the UFE's probability of usage by the user. Based on the probability, the adaptive selection manager decides whether to remove the UFE, whether to reposition the UFE to its parent's hierarchy using SkipList property, whether to change a default functionality of the UFE, whether to reorder the UFE in a list, and/or the like, including combinations and/or multiples thereof.

In an embodiment, there are two trigger points, namely the sluggish detection parameters and the trigger span. In an embodiment, a reduced system performance sends a trigger with the sluggish detection parameters as input. In another embodiment, when the initial trigger span of the UFE is lapsed, the trigger is automatically sent for that UFE.

In another embodiment, the probability assignor (105) uses parameters from the UFE table (108) which are statically defined and are used for modelling of performance driven factors for each UFE, present in the integration graph (602) from the interaction graph builder (101).

The probability assignor (105) uses the RNN attention model for assigning probabilities for each path in the interaction graph. The UFE scores are converted to probabilities while taking several other factors such as trigger, usage stats, featureHit, featureMiss, etc. into account. The probabilities for children of a node sum to 1 in an embodiment. The higher the probability, the greater the possibility of the UFE being used.

The probabilities of each path are then forwarded to the UI decider (104). The UI decider (104) detects and executes UI changes based on either skip levels or put into expiration update expiration time dynamically.

Figure 8:
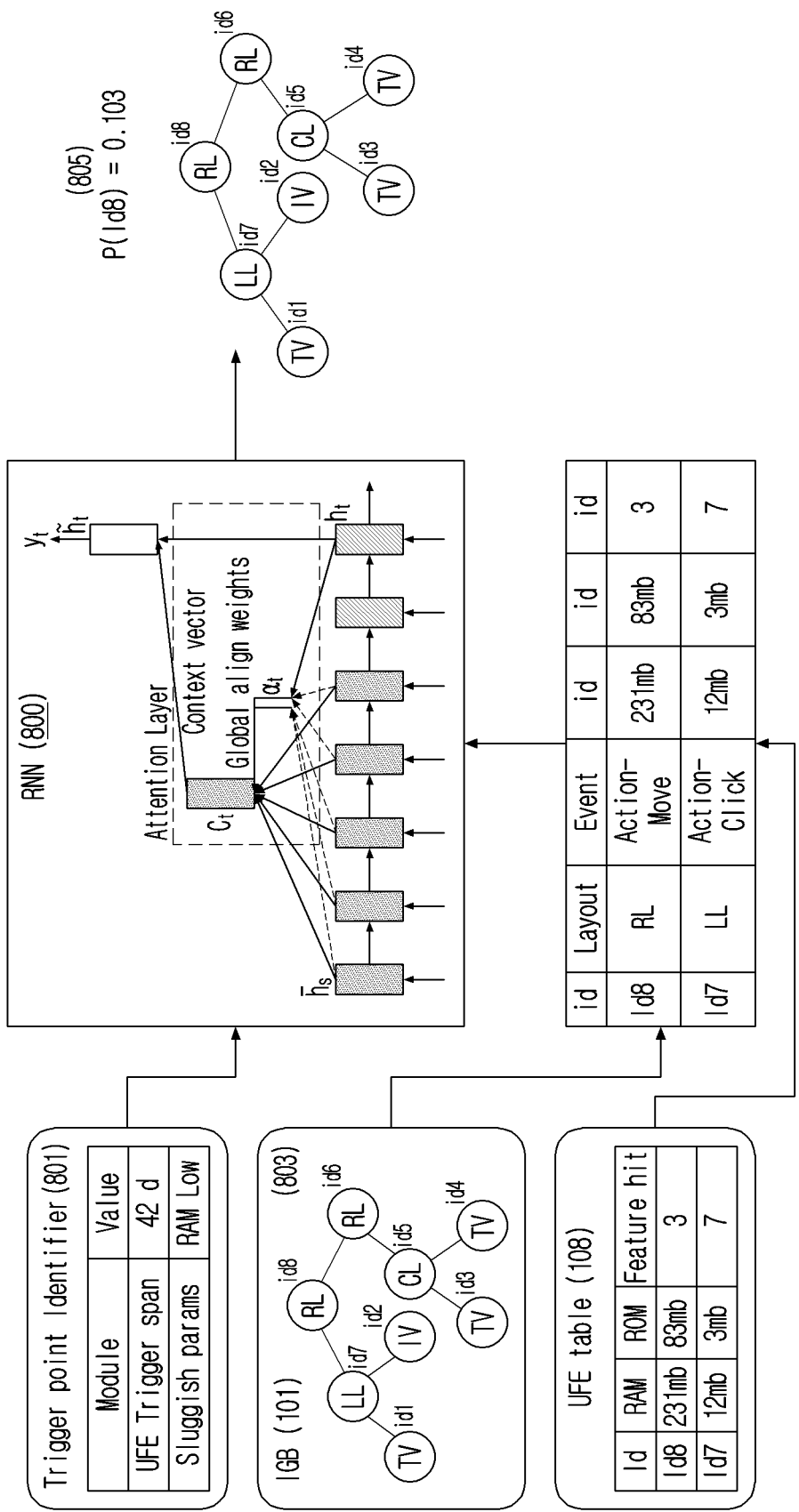
FIG. 8 is a schematic diagram, illustrating an example embodiment of determining the probabilities for each path of the interaction graph, according to an embodiment as disclosed herein.

FIG. 8 is a schematic diagram illustrating an example embodiment of determining the probabilities for each path of the interaction graph, according to an embodiment as disclosed herein.

FIG. 8 includes an RNN (800) for determining the probability. According to an embodiment, the inputs to the RNN (800) are the sluggish parameters and the UFE trigger span as shown at block (801). The other inputs are entries from the UFE, table (802) and the interaction graph (803) from the interaction graph builder (101). According to an embodiment, the inputs (802) and (801) are merged for each element in a layout graph, and a combination of interaction graph parameters and static parameters form the UFE table (108).

The output (805) of the RNN unit is the probability score (e.g., P(id8=0.103)), which is based on the probability calculated for the feature. The trigger span value of the feature is updated as below:

LifeSpan=LifeSpan+UCSfinal−UCSUIThreshold×
    TriggerSpanDelta wherein, TriggerSpanDelta=300 and UCSthreshold is calculated based on parameters.

According to one or more embodiments, P87 Isignifies probability of edge id8→id7 as determined by the probability assigner (105). In an embodiment, a usability composite score defines a score at each edge.

$$UCS87 = [\text{Probability} \times \text{depth}][\text{featureHIT} - \alpha \times \text{featureMiss}],$$

$$USCfinal - USC87 + 1/n \sum_{k=0}^{n} UCSchild$$

According to an embodiment, the total score is defined by defining a weight to each child. Each edge in the graph can have a usability composite score (UCS) assigned to it.

UCSFPThresh is a threshold probability to check for feature path removal. If UCSfinal<UCSFPThresh, then UFE is removed. The UCSFP threshold value can be calculated to decide UCF expiry as follows.

UCSFPThresh=UCS min+UCS min/UCS max

FIGS. 9a-9d are schematic diagrams illustrating a change made to the UFE for providing the adaptive UI, according to an embodiment as discussed herein.

In an embodiment, the UFEs which are selected to be changed by UI decider (104) are sent to a framework executor. The framework executor operates UI changes and handles dependencies which are related to the UFE which is to be modified. According to one or more embodiments, there are 4 scenarios of modifying the UFE.

A first scenario is a skip level property, where whenever the UFE is brought forward by skip level property, the view hierarchy is changed in order to handle the changes.

A second scenario is the default handling, where a sub UFE's default handling is changed in order to align to user preference and increase usage.

A third scenario is change position or reorder in order to improve performance and ease of use.

A fourth scenario is to disable the UFE or the sub UFE.

Figure 9A:
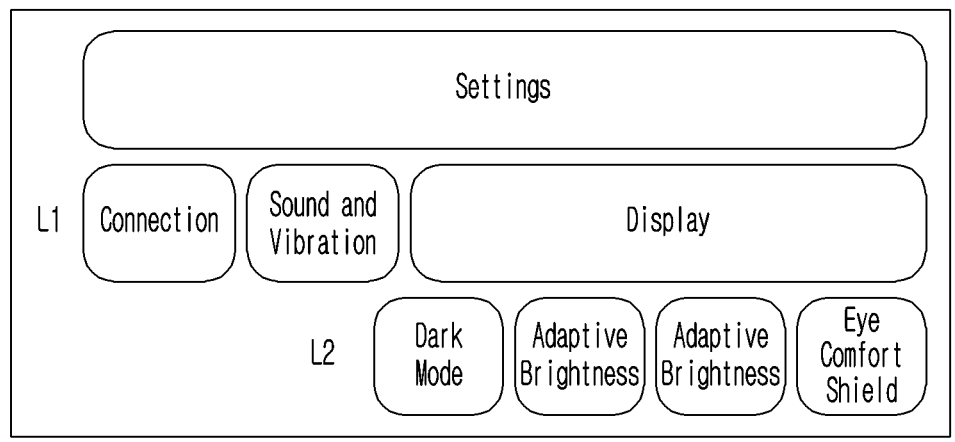
FIGS. 9a, 9b, 9c, and 9d are schematic diagrams, illustrating a change made to the UFE for providing the adaptive UI, according to an embodiment as discussed herein.
Figure 9B:
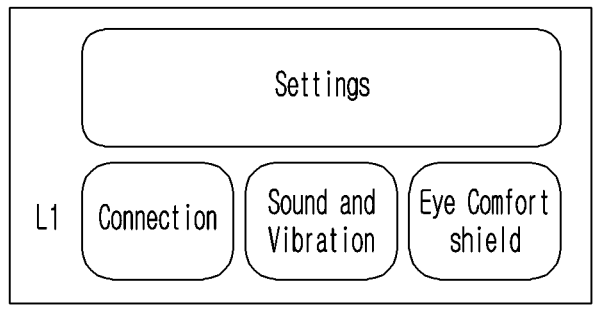

FIGS. 9a and 9b illustrates the first skip level property scenario. When the UFE is brought forward by skip level property, a view hierarchy is changed in order to handle the changes.

As shown in FIG. 9a, different modes are shown in a display setting of the electronic device. In this example, the "eye comfort shield" mode is moved up in the hierarchy as shown in FIG. 9b for providing a better user experience. It may happen that the user is not using other display settings as shown in FIG. 9a and instead is using only the "eye comfort shield" mode frequently. As a result, the hierarchy is changed for providing better user experience.

Figure 9C:
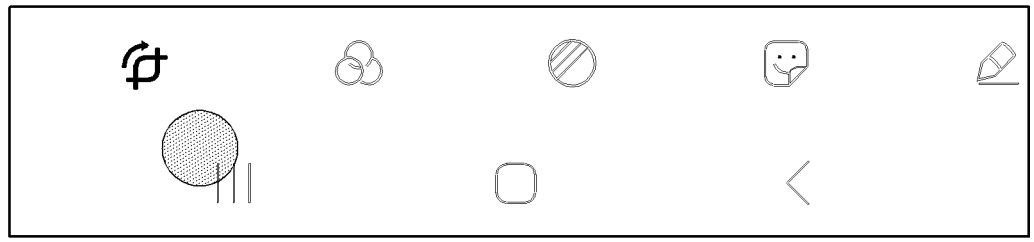
Figure 9D:
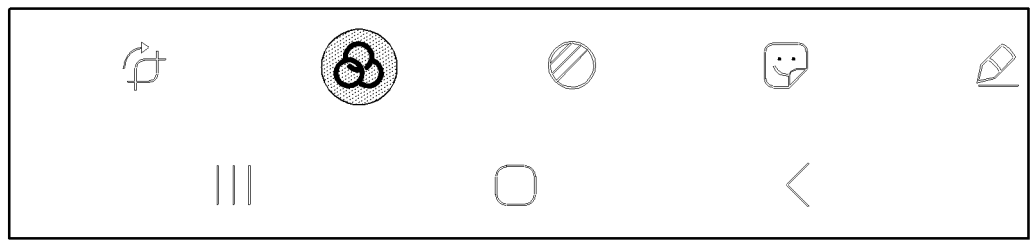

FIGS. 9c and 9d illustrate changing the default handling of the UFE. Under the default handling scenario, the sub UFE's default handling is changed in order to align to user preference and increase usage. The framework executor tracks changes done when user clicks on any option frequently. To make frequently used option as default, the frequency executer triggers fragment transactions and similar functionality of action events when an edited image activity is opened. This will change crop function to color saturation as default.

As shown in FIG. 9c, the default edit setting is crop, where in FIG. 9d the default edit setting is changed to color saturation.

According to an embodiment, the edit settings are changed based on user choice or user past experience.

Figure 9E:
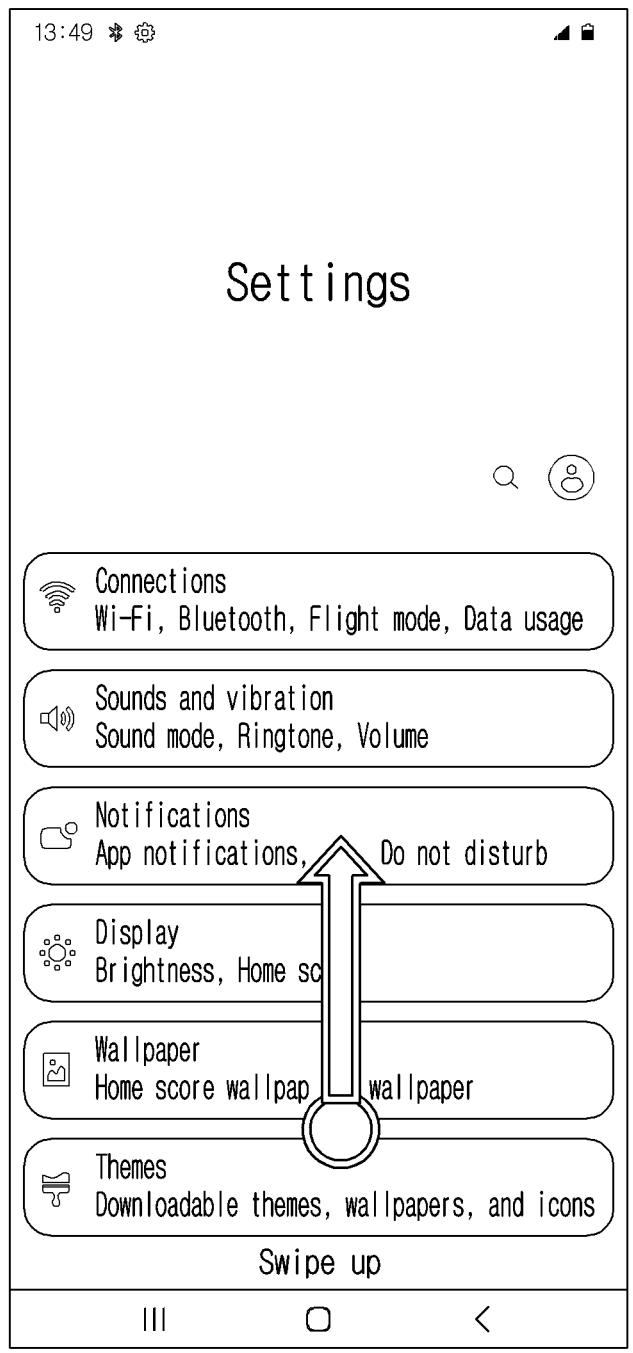
FIGS. 9e, 9f, and 9g are schematic diagrams illustrating change position or re-order scenario, according to an embodiment as disclosed herein.
Figure 9F:
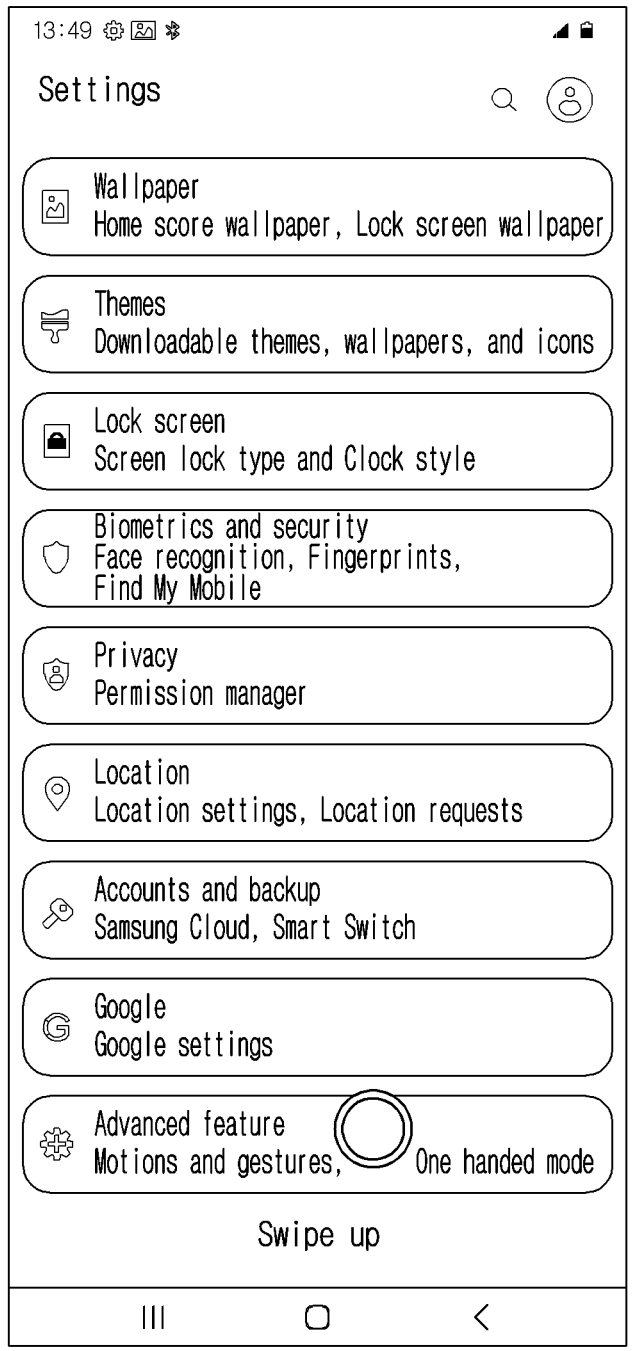
Figure 9G:
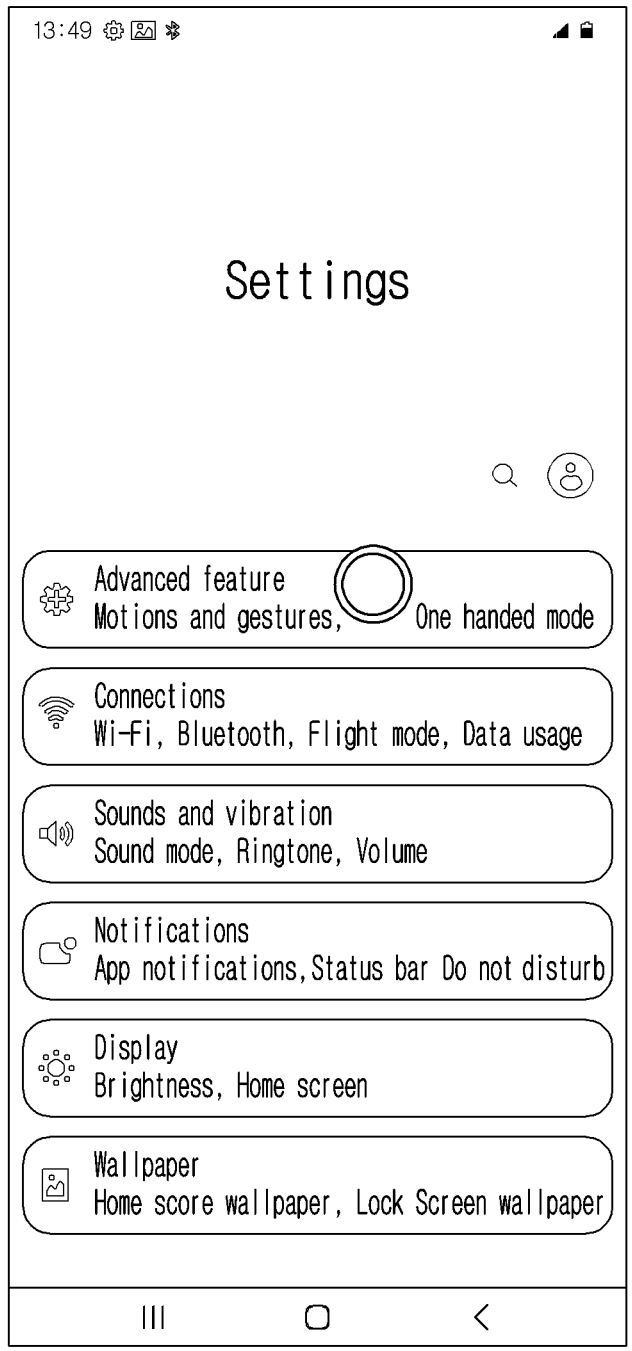

FIGS. 9e-9g are schematic diagrams illustrating change position or re-order scenario, according to an embodiment as disclosed herein.

According to an embodiment, a sub UFEs position or order in view hierarchy is changed in order to align towards user preference and improve performance. In an embodiment, the viewHeirarchy operations at framework level are tweaked.

As shown in FIG. 9e, the user opens the settings option in the electronic device (100), and is unable to find an advanced setting option in the current view. The user scrolls down to find the advanced setting option as shown in FIG. 9f. Scrolling down to find the advanced setting option increases the cognitive load on the electronic device.

One or more embodiments described herein provides for reordering the view hierarchy to bring views of deemed importance on top of hierarchy as shown in FIG. 9g. In an embodiment, once reordering is performed, the hierarchy for the views view lifecycle calls are made. This provides for the display of deemed importance views before others. For other remaining views, a splash view image is shown instead of a real view, and their processing is deferred until further user interaction (e.g., skips loading resources). Thus as shown in FIG. 9g, the advanced setting option is moved to the top of the list.

Figure 9H:
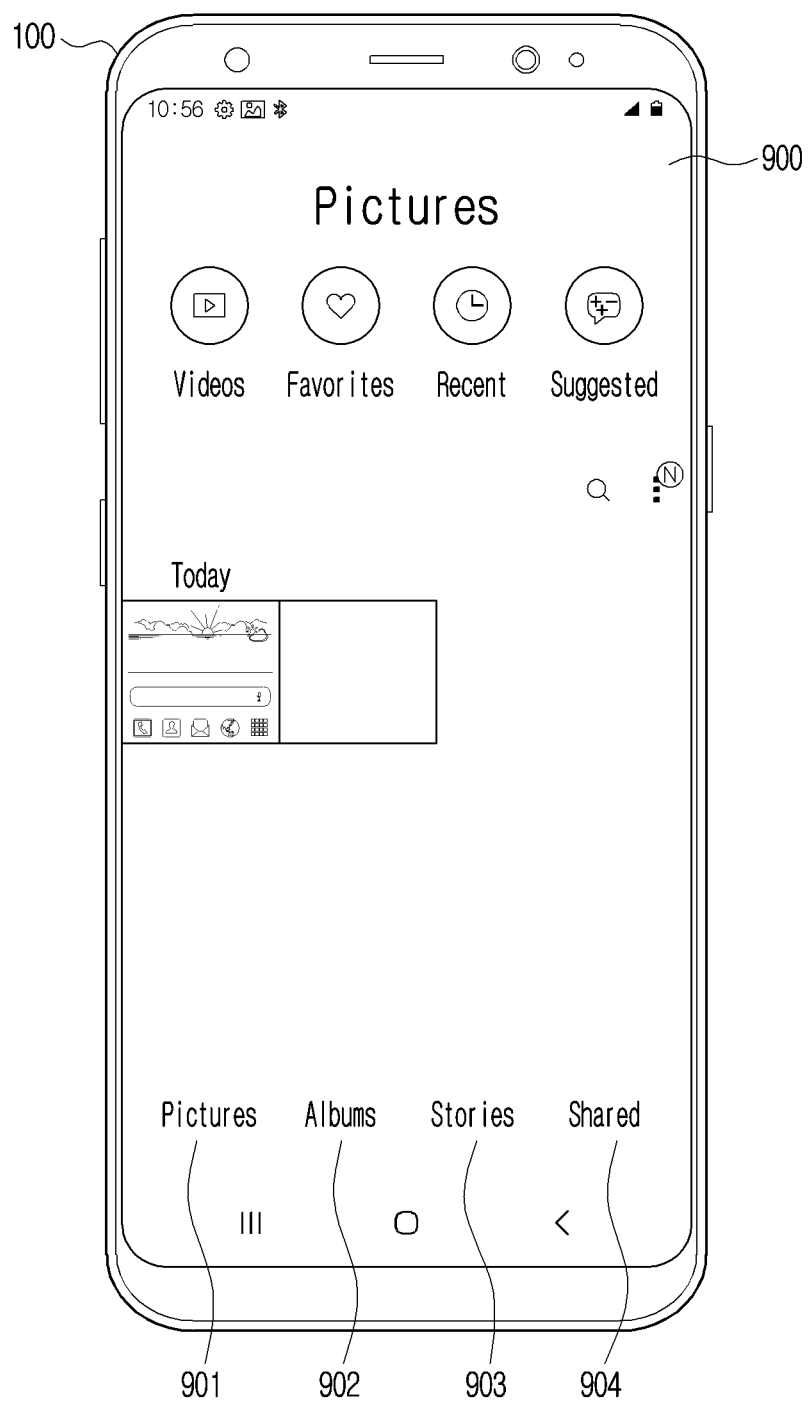
FIGS. 9h and 9i are schematic diagram, illustrating removal of UFE/sub-UFE scenario, according to an embodiment as disclosed herein.
Figure 9I:
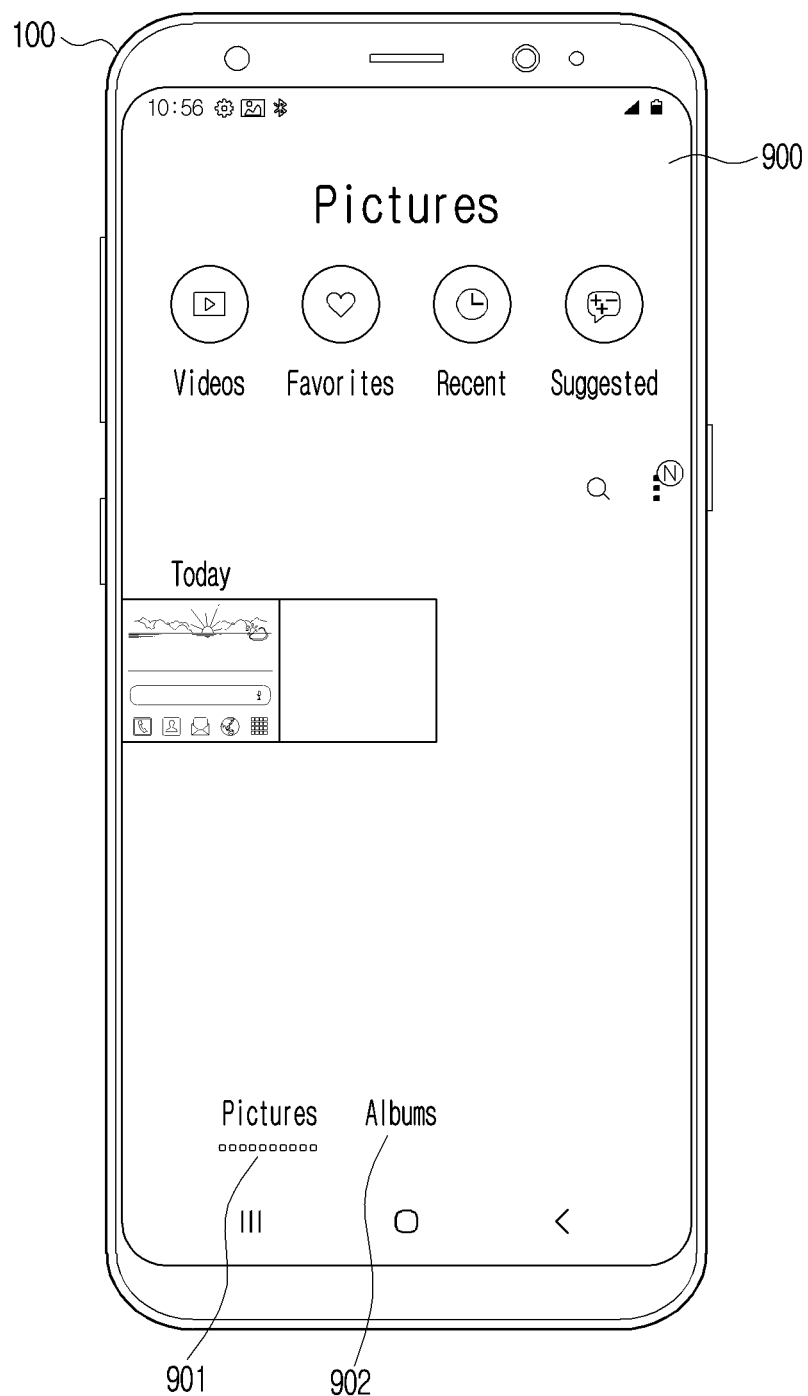

FIGS. 9h and 9i are schematic diagrams illustrating removal of UFE/sub-UFE scenario, according to an embodiment as disclosed herein.

In an embodiment, when the UFE is disabled, the corresponding view hierarchy is removed. The electronic device (100) prunes a child from a parent layout where initiation of the UFE is done. Further, the electronic device (100) handles any UI dependency which might be on that child view.

For example, as shown in FIG. 9h, a layout (900) has a pictures (901), albums (902), stories (903), and shared (904) options. However, the stories (903) and the shared (904) options are removed as shown in FIG. 9i, and the tab layout is changed to have only 2 options. T After removal, the electronic device (100) calls a re-layout and again calls measure on the parent view so that the remaining children are occupy the space vacated by removal of the UFE.

In another embodiment, resource loading which is dependent of the UFE that is disabled is provided.

The framework executor tracks resources being used by each UFE. When a UFE/sub UFE is disabled, the corresponding resources which were only being used by that UFE are restricted from loading in RAM to lighten the RAM load. In another embodiment, the framework executor also tracks libraries and external files which are referred in the UFE being disabled to load in RAM. For preprocessing by the application, like creating cache related to the UFE, the framework executor stops the preprocessing next time app is loaded, for example.

The dependencies of the disabled UFEs are checked from the interaction graph and handled in following way.

Activity: If another application wants to start an activity which has been disabled then the UFE will be enabled at runtime.

Service: Similar to an activity, if a second application wants to start/bind with a service which was present in UFE which was disabled similar dialog is shown as explained for activity.

Content Provider: If anther application is requesting content provider of UFE which has been disabled then the corresponding UFE is enabled and request for access of content provider is processed.

Broadcast Receiver: If other application register broadcast receiver for intent which is only sent from UFE which is being disabled then FES stops the registration of the broadcast listener of other applications.

FIGS. 10a-10d are schematic diagrams illustrating an example scenario of restoring the UFE, according to an embodiment as disclosed herein.

In an embodiment, whenever any changes are done by the framework executor, the corresponding change list is added to a restore pool. Further, the view hierarchy of the corresponding UFE is pruned from the interaction graph and added to a restore tree. Also, when an item is added to the restore pool, a restore button is shown in the options menu to the user. When the user clicks on the restore option, the changes that have been made in the electronic device (100) by the framework executor are visible to the user.

Figure 10A:
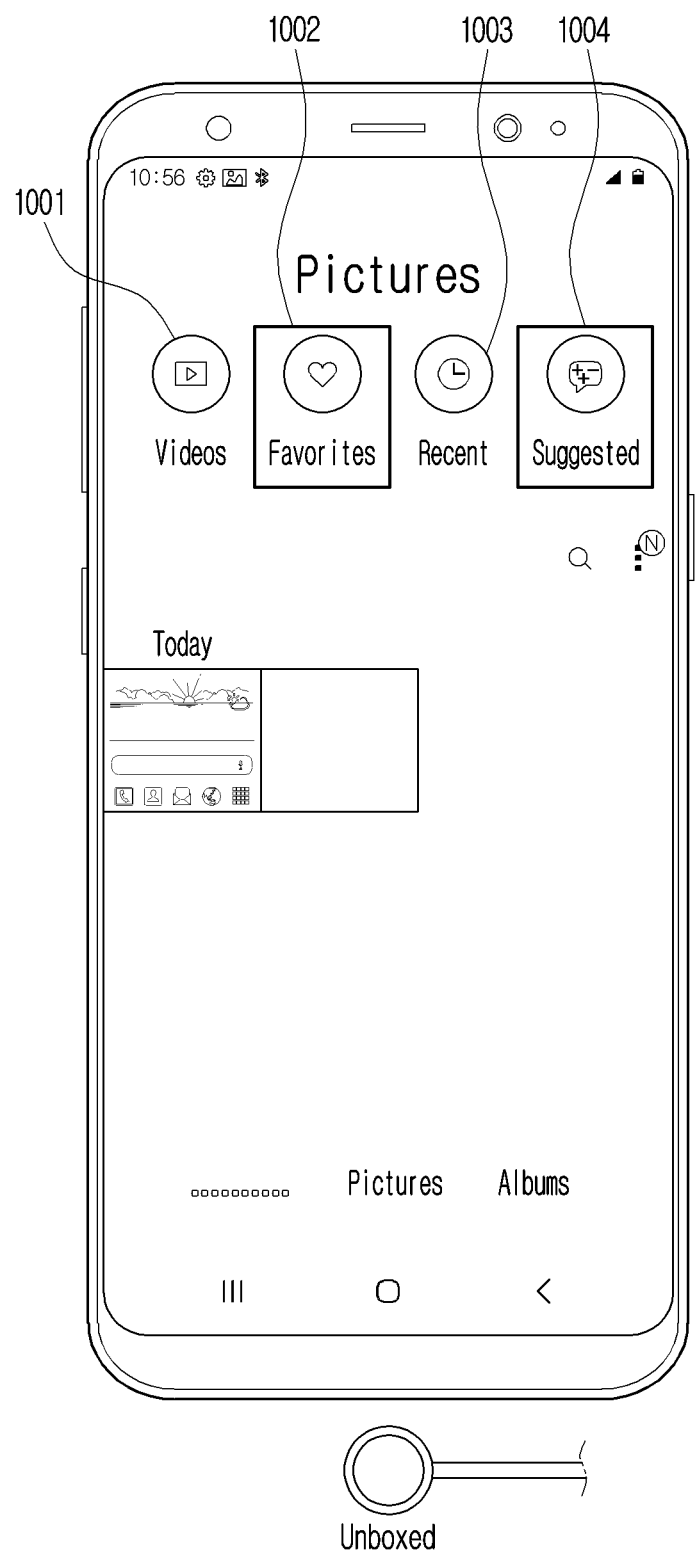
FIGS. 10a, 10b, 10c, and 10d are schematic diagrams illustrating, an example scenario of restoring the UFE, according to an embodiment as disclosed herein.

FIG. 10a shows a UI of a gallery application of the electronic device (100) when the user has just started using the electronic device (100) after unboxing. The electronic device (100) is a mobile electronic device (e.g., a smartphone) in the current example. The UI shows 4 options in the gallery application, namely videos (1001), favorite (1002), recent (1003), and suggested (1004).

Figure 10B:
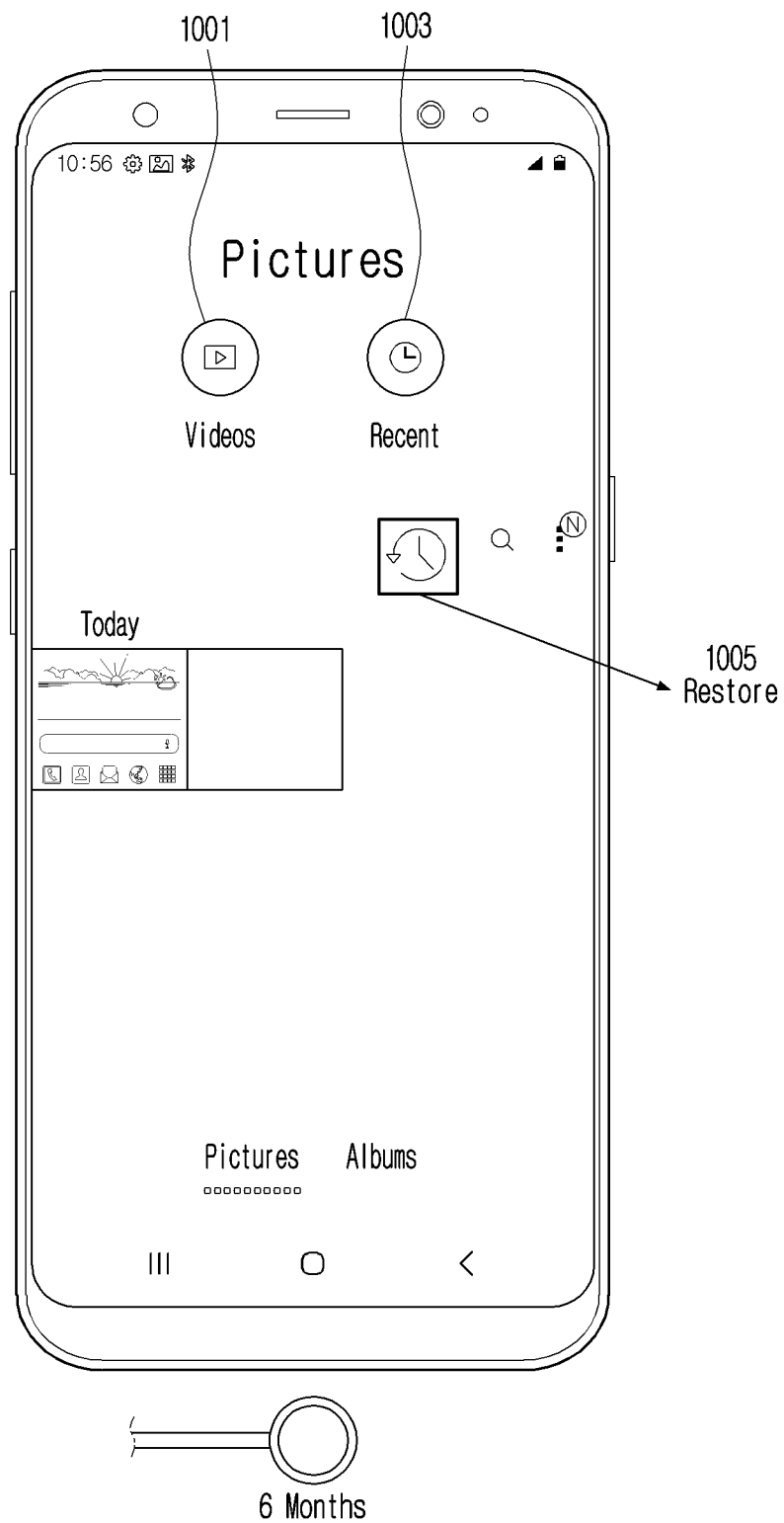

After a period (e.g., 6 months) of usage, the UI is updated using one or more embodiments described herein, and the options favorite (1002) and suggested (1004) are removed from the UI as shown in FIG. 10b. However, the UI shows an icon (1005) for restoring the options favorite (1002) and suggested (1004).

Figure 10C:
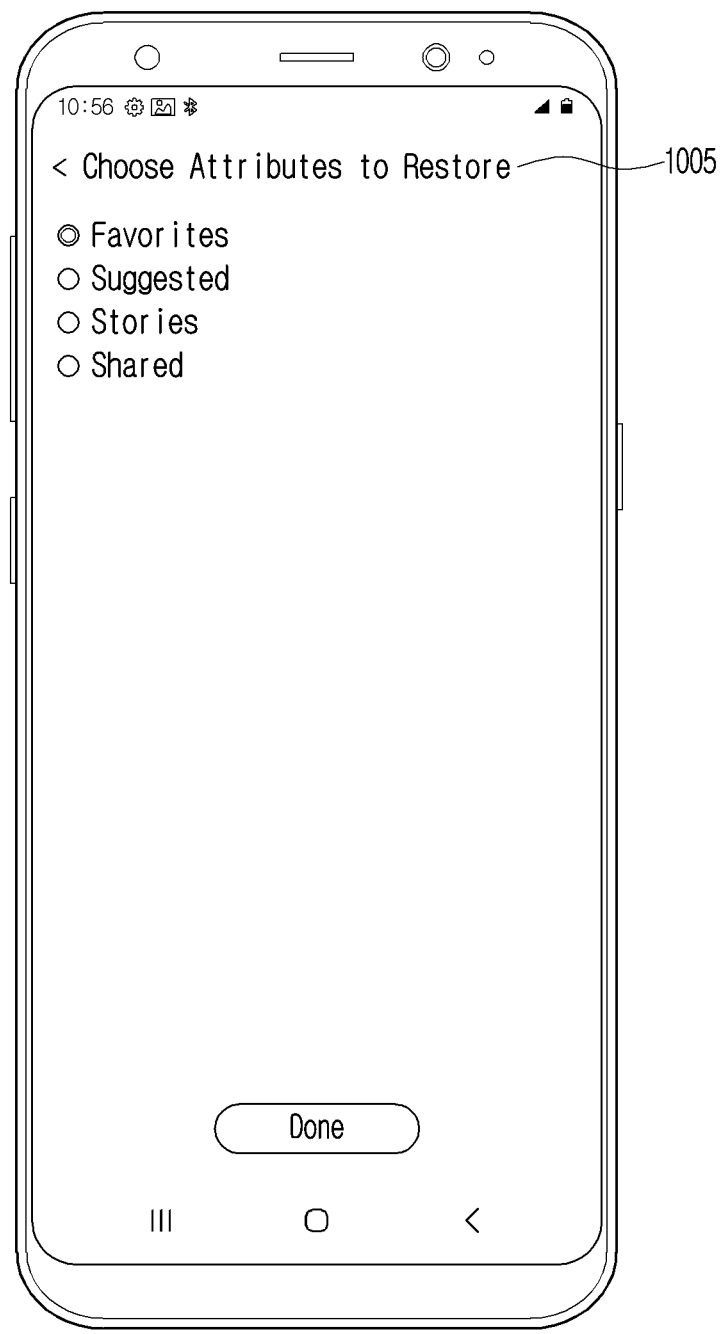

As shown in FIG. 10c, when the restore (1005) icon is selected, a list of attributes associated with the removed options are presented to the user for restoring.

Figure 10D:
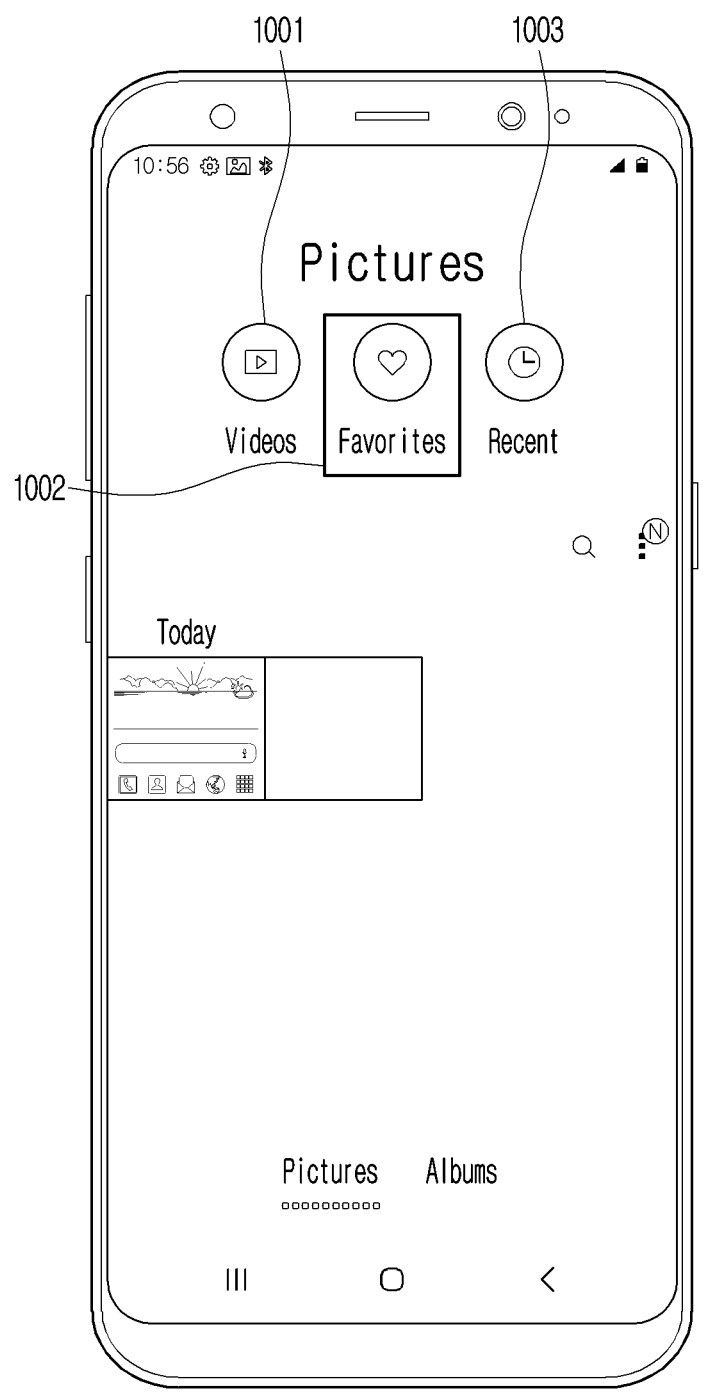

The user selects a desired option (e.g., the favorites (1002) option) for restoring. The favorite (1002) option is then displayed on the UI as shown in FIG. 10d.

In an embodiment, the restoring option provides flexibility by predicting which UFE is not useful or is rarely used and that UFE can be removed without diminishing the user experience as user has the option to restore the UFEs. Further, the restore option also gives flexibility to the user as the user can restore any option which might be used rarely. Once the work is done, the UFE, can again be removed as per an ageing policy if UFE is not used again by user.

The forgoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

What is claimed is:

1. A method of providing an adaptive user interface in an electronic device, the method comprising:
   identifying, by the electronic device, a user functional element (UFE) in an application of the electronic device;
   determining, by the electronic device, a trigger span for the UFE;
   initiating, by the electronic device, a trigger in response to determining that the trigger span for the UFE is expired and in response to a sluggish score being less than a threshold sluggish score, the sluggish score being based on performance parameters for the electronic device, the performance parameters relating to a resource usage of the electronic device;
   determining, by the electronic device, a probability of use of the UFE for which the trigger is initiated;
   determining, by the electronic device, that the probability of the use of the UFE is less than a threshold probability; and
   updating, by the electronic device, the adaptive user interface associated with the UFE the based on the probability.

2. The method as claimed in claim 1, wherein identifying, by the electronic device, the UFE comprises:
   generating, by the electronic device, a first interaction graph for each element in the application based on a user interaction and a plurality of parameters associated with the electronic device;
   extracting, by the electronic device, at least one of an element or event associated with a user interface element based on a user interaction;
   generating, by the electronic device, a second interaction graph based on the at least one of the extracted element or event;
   assigning, by the electronic device, a UFE score to each node in the second interaction graph, wherein each node corresponds to one of the at least one extracted element or event;
   identifying, by the electronic device, the UFE based on the UFE score.

3. The method as claimed in claim 1, wherein determining the trigger span for the UFE comprises:
   determining, by the electronic device, an initial trigger span for the UFE based on a plurality of static parameters of the electronic device, wherein the plurality of static parameters comprises a battery usage, an available memory, and a processor load; and
   updating, by the electronic device, the initial trigger span in intervals based on a usage of the application and a preference of the user.

4. The method as claimed in claim 1, wherein updating the UI associated with the UFE comprises:
   determining, by the electronic device, based on the probability, one of:
   whether the at least UFE is to be removed;
   whether the UFE is to be re-ordered in a list,
   whether a default functionality of the at least UFE is to be changed, and
   whether the UFE is to be re-positioned to a senior hierarchy using a skip list property; and
   updating, the adaptive user interface associated with the UFE in response to the determining by performing one of:
   removing the UFE,
   re-ordering the UFE in the list,
   changing a default functionality of the UFE, and re-positioning the UFE to the senior hierarchy using the skip list property.

5. The method as claimed in claim 1, further comprising assigning a UFE score to each node in an interaction graph, wherein the UFE score is used to determine a dependency between nodes of the interaction graph.

6. The method as claimed in claim 1, wherein determining the probability of use of the UFE comprises:
providing, by the electronic device, an interaction graph, a sluggish parameter, and a trigger span to a recurrent neural network (RNN);
receiving, by the electronic device, the probability of use of the UFE from the RNN.

7. The method as claimed in claim 4, further comprising restoring by the electronic device a removed UFE.

8. An electronic device for providing an adaptive user interface (UI) the electronic device comprising:
a memory; and
a processor configured to:
identify a user functional element (UFE) in an application of the electronic device;
determine a trigger span for the UFE;
initiate a trigger in response to determining that the trigger span is expired for the UFE and in response to a sluggish score being less than a threshold sluggish score, the sluggish score being based on performance parameters for the electronic device, the performance parameters relating to a resource usage of the electronic device;
determine a probability of use of the UFE for which the trigger is initiated;
determine that the probability of the use of the UFE is less than a threshold probability; and
update the adaptive user interface associated with the UFE the based on the probability.

9. The electronic device as claimed in claim 8, wherein identifying the UFE comprises:
generating a first interaction graph for each element in the application based on a user interaction and a plurality of parameters associated with the electronic device;
extracting, at least one of an element or event, associated with a user interface element based on a user interaction;
generating a second interaction graph based on the at least one of the extracted element or event;
assigning a UFE score to each node in the second interaction graph, wherein each node corresponds to one of the at least one extracted element or event; and
identifying the UFE based on the UFE score.

10. The electronic device as claimed in claim 8, wherein determining the trigger span for the UFE identified comprises:
determining an initial trigger span for the UFE based on a plurality of static parameters of the electronic device, wherein the plurality of static parameters comprises a battery usage, an available memory, and a processor load; and
updating the initial trigger span in intervals based on a usage of the application and a preference of the user.

11. The electronic device as claimed in claim 8, wherein updating the UI associated with the UFE comprises:
determining based on the probability, one of:
whether the at least UFE is to be removed;
whether the UFE is to be re-ordered in a list,
whether a default functionality of the UFE is to be changed, and
whether the UFE is to be re-positioned to a senior hierarchy using a skip list property; and
updating, the user interface associated with the UFE in response to the determining by performing one of:
removing the UFE,
re-ordering the UFE in the list,
changing a default functionality of the least UFE, and
re-positioning the UFE to the senior hierarchy using a skip list property.

12. The electronic device as claimed in claim 8, wherein the processor assigns a UFE score to each node in the interaction graph, wherein the UFE score is used to determine a dependency between nodes of the interaction graph.

13. The electronic device as claimed in claim 8, wherein determining the probability of use of the UFE comprises:
providing an interaction graph, a sluggish parameter, and a trigger span to a recurrent neural network (RNN); and
receiving the probability of use of the UFE from the RNN.

14. A method comprising:
monitoring an application executing on an electronic device over time to learn user interaction habits of a user with user functional elements of the application;
calculating a priority value for each of the user functional elements based at least in part on the user interaction habits;
calculating a sluggish score based on performance parameters of the electronic device, the performance parameters relating to a resource usage of the electronic device;
determining a trigger span for the user functional elements;
initiating a trigger in response to determining that the trigger span for the user functional elements is expired and in response to a sluggish score being less than a threshold sluggish score; and
responsive to determining that a priority value fails to satisfy a priority threshold for at least one of the user functional elements, and responsive to initiation of the trigger, updating an adaptive user interface for the application based at least in part on the user interaction habits.

15. The method of claim 14, wherein updating the adaptive user interface comprises removing the at least one of the user functional elements from the adaptive user interface.

16. The method of claim 15 further comprising, responsive to a user command, restoring the at least one of the user functional elements to the adaptive user interface.

17. The method of 14, wherein updating the adaptive user interface comprises reordering the at least one of the user functional elements on the adaptive user interface relative to at least one other of the user functional elements.

* * * * *